(12) United States Patent
Chen

(10) Patent No.: US 7,349,600 B2
(45) Date of Patent: *Mar. 25, 2008

(54) ACTIVE IN-FIBER OPTIC COMPONENTS POWERED BY IN-FIBER LIGHT

(75) Inventor: Peng Chen, Pittsburgh, PA (US)

(73) Assignee: University of Pittsburgh - Of the Commonwealth System of Higher Education, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/741,396

(22) Filed: Apr. 27, 2007

(65) Prior Publication Data

US 2007/0201794 A1    Aug. 30, 2007

Related U.S. Application Data

(63) Continuation of application No. 11/038,738, filed on Jan. 20, 2005, now Pat. No. 7,239,778.

(60) Provisional application No. 60/538,708, filed on Jan. 23, 2004, provisional application No. 60/559,124, filed on Apr. 2, 2004.

(51) Int. Cl.
G02B 6/34    (2006.01)

(52) U.S. Cl. .......................................... 385/37; 385/127

(58) Field of Classification Search ................... 385/37, 385/127
See application file for complete search history.

(56) References Cited

U.S. PATENT DOCUMENTS

| | | | |
|---|---|---|---|
| 5,216,739 A | 6/1993 | Hill et al. | |
| 5,963,680 A | 10/1999 | Kleinerman | |
| 6,067,392 A | 5/2000 | Wakami et al. | |
| 6,396,572 B1 | 5/2002 | Chang et al. | |
| 6,411,746 B1 | 6/2002 | Chamberlain et al. | |
| 6,490,078 B2 | 12/2002 | Enomoto et al. | |
| 6,597,849 B2 | 7/2003 | Ishikawa et al. | |
| 6,768,839 B2 | 7/2004 | Blomquist et al. | |
| 6,842,566 B2 | 1/2005 | Ishikawa et al. | |
| 6,965,708 B2 | 11/2005 | Luo et al. | |
| 2002/0118939 A1 | 8/2002 | Taru et al. | |
| 2003/0021533 A1* | 1/2003 | Ishikawa et al. | ............... 385/37 |
| 2003/0185269 A1 | 10/2003 | Gutin | |
| 2004/0042721 A1 | 3/2004 | Kroupenkine et al. | |

* cited by examiner

*Primary Examiner*—Ellen E. Kim
(74) *Attorney, Agent, or Firm*—Philip E. Levy; Eckert Seamans Cherin & Mellott, LLC

(57) ABSTRACT

An optical fiber system that includes an in-fiber optic component powered by in-fiber light includes an optical fiber having a core, wherein the optical fiber propagates a sensing/signal light and a power light, with the sensing/signal light being propagated in the core. An optical transducing element, such as a layer of light absorbing material, is located in proximity to the in-fiber optic component. An optical tap region is provided in the optical fiber in proximity to the optical transducing element, and enables the power light to leak from the optical fiber and be absorbed by the optical transducing element. The optical transducing element converts the absorbed power light into a second energy form, such as heat, which is used to tune the in-fiber optic component.

25 Claims, 15 Drawing Sheets

ACTIVE IN-FIBER OPTIC COMPONENTS POWERED BY IN-FIBER LIGHT

CROSS-REFERENCE TO RELATED APPLICATION

This application is a continuation of U.S. application Ser. No. 11/038,738 entitled "Active In-Fiber Optic Components Powered by In-Fiber Light," which was filed on Jan. 20, 2005 now U.S. Pat. No. 7,239,778 and which claims the benefit of U.S. Provisional Application No. 60/538,708 entitled "Active Fiber Powered by In-Fiber Light," which was filed on Jan. 23, 2004 and U.S. Provisional Application No. 60/559,124 entitled "Active Fiber Optical Components Powered by Light," which was filed on Apr. 2, 2004.

BACKGROUND OF THE INVENTION

1. Field of the Invention

The present invention relates to fiber optic components used in applications such as fiber optic communications and sensing, and more specifically to active in-fiber optic components that are powered by in-fiber light.

2. Description of Related Art

Fiber optic components, such as, without limitation, Fiber Bragg Gratings (FBGs), fiber interferometers, and Fabry-Perot cavities (FPs) are well known and are key components used in many optical communication and sensing applications. For example, such components are often utilized in constructing multiplexers and de-multiplexers used in wavelength division multiplexing (WDM) optical communications systems, and in constructing optical strain sensors, temperature sensors, pressure or vibration sensors, chemical sensors and accelerometers. In-fiber optic components, meaning those provided in or as part of an optical fiber, offer several important advantages over other optical and electronic devices, including low manufacturing cost, immunity to electromagnetic radiation and changing (often harsh) ambient conditions, an explosive-proof and in-vivo safe nature, long lifetime, and high sensitivity.

Historically, in-fiber optic components have been passive, meaning they cannot be actively adjusted and/or reconfigured once deployed to, for example, adopt new network topologies or adjust sensing parameters including sensitivity, set point, triggering time, dynamic range and responsivity. In addition, passive in-fiber optic components require delicate and costly packaging to eliminate temperature drifting. These facts have, despite the advantages described above, limited the performance and use of in-fiber components. As a result, work has been done to develop tunable in-fiber optic components, such as a tunable FBG. As is known in the art, an FBG consists of a series of perturbations, forming a grating, in the index of refraction along the length of an optical fiber. An FBG reflects a spectral peak of a light that is transmitted through the fiber, and the particular spectral peak (called the resonance wavelength) that is reflected depends upon the grating spacing. Thus, changes in the length of the fiber due to heat, tension or compression will change the spacing of the grating (and to a lesser extent, the grating component indices of refraction) and thus the wavelength of the light that is reflected.

A typical prior art implementation of an FBG is shown in FIG. 1, and includes optical fiber 5 having core 10 surrounded by cladding 15, wherein the core 10 is provided with a grating 20. The light transmitted through optical fiber 5 and reflected by grating 20 is shown by the arrow in FIG. 1. The grating 20 shown in FIG. 1 has a constant period, Λ, meaning the grating elements are evenly spaced, and is referred to as a uniform FBG. FBGs may also include gratings that have a varying period. Such FBGs are referred to as chirped FBGs, and reflect multiple spectral peaks. Long period gratings, in which the spacing is large compared to the core diameter, and apodized gratings are also useful. Tuning mechanisms (for changing the fiber length and other characteristics such as refractive index) that have been previously explored for FBGs and other in-fiber optic components include on-fiber electrical heating, piezoelectric actuators, mechanical stretching and bending, and acoustic modulation. The problem has been that each of these tuning mechanisms requires an energy source for operation, which, to date, has been electrical. In particular, electrical cable must be run with the optical fiber to provide current for on-fiber heating elements, to supply voltages to drive piezoelectric actuators, to drive stepper motors to stretch and bend the fibers, or to initialize acoustic waves. Additional cabling of this sort is problematic, as it, among other things, typically increases manufacturing costs, is bulky, is not immune to electromagnetic radiation, is difficult to embed in materials and structures, and typically has a shorter lifetime than the associated, normally durable optical fibers.

Thus, there is a need for a mechanism for powering and tuning in-fiber optic components that does not require additional electrical cabling. Such a mechanism would allow fiber optic systems to take advantage of the improved performance and functionality of in-fiber optic components without the disadvantages and drawbacks presented by electrical cabling.

SUMMARY OF THE INVENTION

The present invention relates to an optical fiber system that includes an in-fiber optic component that is powered by in-fiber light. The optical fiber system may be used in, for example, sensing or communications applications. In particular, the system includes an optical fiber having a core, wherein the optical fiber propagates a sensing/signal light and a power light, with the sensing/signal light being propagated in the core. In some applications, the power light is preferably spectrally distinct from the sensing/signal light. An optical transducing element is located in proximity to the in-fiber optic component. In one particular embodiment, the optical transducing element includes a layer of light absorbing material, such as a metal film, that is attached to, and preferably surrounds, the optical fiber at a location in proximity to the first location. The system further includes an optical tap region that is provided in the optical fiber in proximity to the optical transducing element. The optical tap region enables at least a portion of the power light to leak (i.e., be released from) from the optical fiber and be absorbed by the optical transducing element. The optical transducing element converts the absorbed power light into a second energy form, which is used to tune the in-fiber optic component. In the embodiment where the optical transducing element is a layer of light absorbing material, the second energy form is heat that is radiated by and/or conducted from the light absorbing material and that heats either or both of the optical fiber and the in-fiber optic component.

According to one particular embodiment, the optical fiber includes an inner cladding surrounding the core and an outer cladding surrounding the inner cladding. In this embodiment, the power light is propagated by at least the inner cladding and preferably also the core. The core may be made of a first material having a first index of refraction, the inner cladding may be made of a second material having a second index of refraction, and the outer cladding may be made of a third material having a third index of refraction. The first index of refraction is greater than the second index of refraction that, in turn, is greater than the third index of refraction. Such a configuration ensures that the sensing/signal light will be confined generally to the core and the power light will be confined generally to the inner cladding except at the optical tap region. In one specific implementation, the first material comprises fused silica doped with at least a first doping material, such as germanium or germanium and boron, the second material comprises fused silica, and the third material comprises fused silica doped with at least a second doping material such as fluorine. The optical tap region in this embodiment may comprise a portion of the inner cladding in which the second index of refraction has been reduced to a value that is less than the third index of refraction.

In an alternate embodiment, the optical fiber includes a single mode fiber portion joined to a multimode fiber portion at a junction point. The core described above in this embodiment is part of the single mode fiber portion and the multimode fiber portion has a second core in which the power light propagates. The diameter of the second core is greater than the diameter of the first core, resulting in leakage of at least a portion of the power light at the junction point. Thus, the junction point comprises the optical tap region. The single mode fiber portion may include a cladding surrounding the core, wherein the at least a portion of the power light leaks into the cladding from the junction point and ultimately leaks from the optical fiber.

According to yet a further embodiment, the single mode fiber portion may include a first single mode fiber portion and a second single mode fiber portion separated by a cavity. In this embodiment, the first single mode fiber portion preferably has a first partially reflective plate attached to an end thereof and the second single mode fiber portion has a second partially reflective plate attached to an end thereof. The cavity is thus located between the first and second partially reflective plates. In this embodiment, the in-fiber optic component includes the first and second partially reflective plates and the cavity, which together may act as a Fabry-Perot filter.

The present invention also relates to a method of tuning an in-fiber optic component provided at least partially in the core of an optical fiber at a first location, wherein the core propagates a sensing/signal light. The method includes providing an optical transducing element in proximity to the first location, propagating a power light in the optical fiber, and causing at least a portion of the power light to leak from the optical fiber and be absorbed by the optical transducing element. The optical transducing element converts the absorbed power light into a second energy form that tunes the in-fiber optic component. The optical transducing element may comprise a layer of light absorbing material, such as a layer of metal, that is attached to the optical fiber in proximity to the first location, and the second energy form may be heat that heats the in-fiber optical component, thereby tuning it.

An additional aspect of the present invention relates to an optical fiber that includes a core, an inner cladding surrounding the core, and an outer cladding surrounding the inner cladding. The core is made of a first material having a first index of refraction, the inner cladding is made of a second material having a second index of refraction, and the outer cladding is made of a third material having a third index of refraction, wherein the first index of refraction is greater than the second index of refraction, and the second index of refraction is greater than the third index of refraction. In one particular embodiment, the first index of refraction is equal to about 1.45, the second index of refraction is equal to about 1.445, and the third index of refraction is equal to about 1.44.

Another aspect of the invention relates to a method of measuring a flow rate of a fluid. The method includes providing an FGB in a core of an optical fiber at a first location, wherein the core propagates a sensing/signal light, providing a layer of light absorbing material attached to the optical fiber in proximity to the first location, and propagating a power light in the optical fiber. The method also includes causing at least a portion of the power light to leak from the optical fiber and be absorbed by the layer of light absorbing material, wherein the light absorbing material converts the absorbed light into heat and radiates and/or conducts the heat, which in turn heats the FBG. According to the method, a first resonance wavelength of the FBG is measured without the fluid flowing past the FBG, a second resonance wavelength of the FBG is measured with the fluid flowing past the FBG, and the flow rate is determined based upon a difference between the first and second resonance wavelengths. The core, in another particular embodiment, has an elliptical shape, and may be a polarization maintaining ellipse.

Yet another aspect of the invention relates to an alternate method of measuring a flow rate of a fluid (a constant wavelength/variable power method). This method includes providing an FGB in a core of an optical fiber at a first location, wherein the core propagates a sensing/signal light, providing a layer of light absorbing material attached to the optical fiber in proximity to the first location, and propagating a first power light at a first power level in the optical fiber without the fluid flowing past the FBG. The method also includes causing at least a portion of the first power light to leak from the optical fiber and be absorbed by the layer of light absorbing material, wherein the light absorbing material converts the absorbed first power light into first heat and radiates and/or conducts the first heat. The first heat heats the FBG and a first wavelength reflected by the FBG is measured. The method further includes propagating a second power light at a second power level in the optical fiber with the fluid flowing past the FBG at the flow rate, causing at least a portion of the second power light to leak from the optical fiber and be absorbed by the layer of light absorbing material, wherein the light absorbing material converts the absorbed second power light into second heat and radiates and/or conducts the second heat. The second heat heats the FBG and a second wavelength reflected by the FBG is measured, wherein the second wavelength is substantially equal to the first wavelength. The flow rate is then determined based on the second power level.

According to still a further aspect of the invention, a method of measuring the level of a liquid in a container is provided. The method includes providing an FBG in the core of an optical fiber at a first location, wherein the core propagates a sensing/signal light, providing a layer of light absorbing material attached to the optical fiber in proximity to the first location, propagating a power light in the optical fiber, and causing at least a portion of the power light to leak from the optical fiber and be absorbed by the light absorbing material. The light absorbing material converts the absorbed power light into heat that is radiated and/or conducted and absorbed by the FBG. The method further includes measuring a resonance wavelength of the FBG, wherein the resonance wavelength is substantially equal to a first value when the first location is covered by the liquid and a second value when the first location is not covered by the liquid, and monitoring the resonance wavelength that is being measured for either a shift from the first value to the second value or a shift form the second value to the first value.

It is an object of this invention to provide a mechanism for powering and tuning in-fiber optic components.

It is a further object of this invention to provide a mechanism for powering and tuning in-fiber optic components that eliminates any additional electrical cabling.

It is still a further object of this invention to provide an optical fiber system that exhibits immunity to electromagnetic radiation.

It is still a further object of this invention to provide an optical fiber system that is relatively lightweight.

It is still a further object of this invention to provide an optical fiber system that exhibits immunity to high voltages.

It is still a further object of this invention to provide an optical fiber system that includes relatively little or no metal.

It is still a further object of this invention to provide an optical fiber system that is not adversely affected by changing ambient conditions.

It is still a further object of this invention to provide an optical fiber system that is relatively inexpensive to manufacture.

BRIEF DESCRIPTION OF THE DRAWINGS

These and other advantages of the present invention will become readily apparent upon consideration of the following detailed description and attached drawings, wherein.

DETAILED DESCRIPTION OF THE PREFERRED EMBODIMENT

The present invention relates to various systems and methods for providing active in-fiber optic components that are powered by in-fiber light. Specifically, as described in greater detail herein, various optical fibers are provided that propagate both a sensing or signal light and a power light wherein the power light is used to provide the energy required to tune the in-fiber optic component.

Figure 2A:
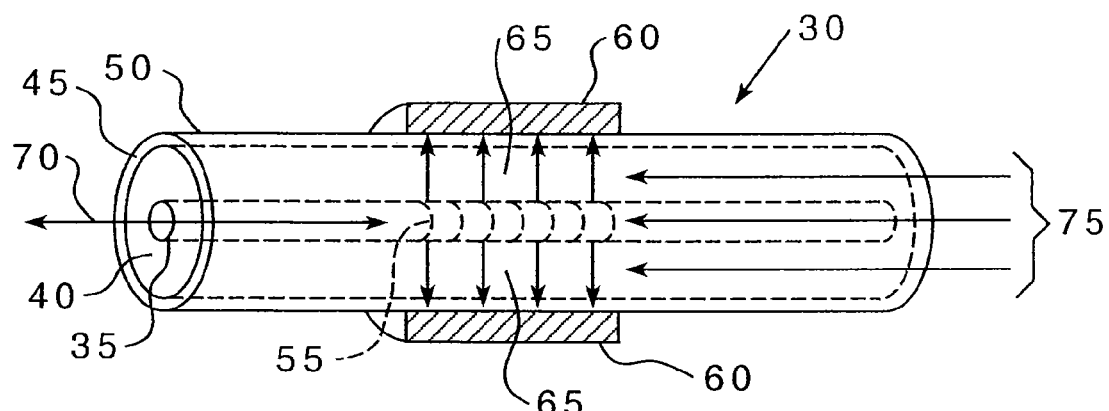
FIGS. 2A and 2B are a partial cross-sectional side view and a side view, respectively, of an optical fiber having a tunable in-fiber optic component according to one embodiment of the present invention.
Figure 2B:
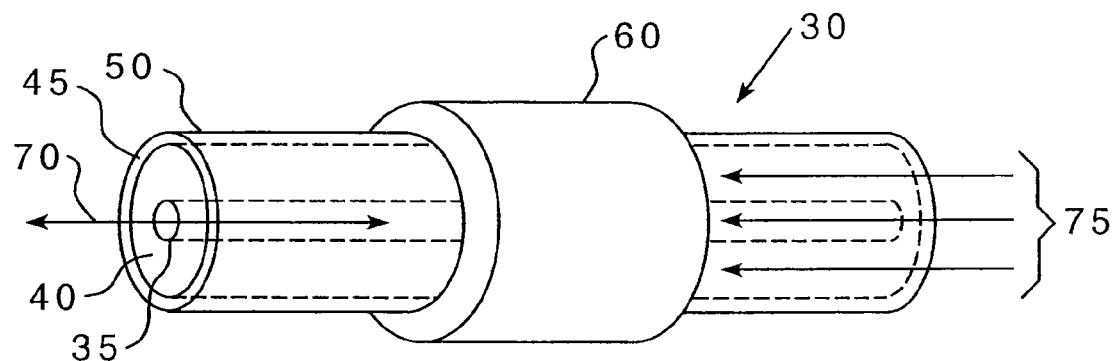
Figure 3:
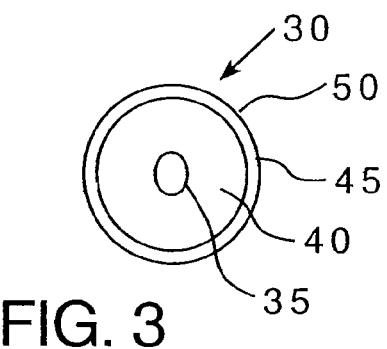
FIG. 3 is a cross-sectional end view of the optical fiber shown in FIGS. 2A and 2B.

FIGS. 2A and 2B are side views (2A in partial cross-section) and FIG. 3 is a cross-sectional end view of optical fiber 30 according to one embodiment of the present invention. As seen most readily in FIG. 3, optical fiber 30 includes a core 35, inner cladding 40, outer cladding 45 and protective layer 50. Preferably, core 35, inner cladding 40 and outer cladding 45 are made of light propagating materials, wherein core 35 has an index of refraction that is greater than the index of refraction of inner cladding 40, which in turn is greater than the index of refraction of outer cladding 45. Except as otherwise described herein, establishing the relative indices of refraction in this manner causes light propagating in core 35 to be confined therein, and light propagating in inner cladding 40 to be confined therein. Inner cladding 40 and outer cladding 45 may be formed by a number of known techniques, such as modified chemical vapor deposition (MCVD). The thickness of outer cladding 45 is preferably about 10 μm to allow for convenient optical tap region fabrication as described elsewhere herein. In addition, inner cladding 40 and outer cladding 45 should be highly transparent.

In one particular embodiment, core 35 is made of a glass material such as fused silica that is doped with germanium and/or boron to increase the index of refraction thereof, inner cladding 40 is made of fused silica, and outer cladding 45 is made of fused silica that is doped with fluorine (preferably 3-mole % fluorine) to decrease the index of refraction thereof. Preferably, core 35 is doped to achieve an N.A. value of about 0.16, which is slightly higher than the N.A. value of 0.13 for standard telecommunications fibers. Both pure silica and fluorine-doped silica are transparent to UV light, which allows uniform penetration of KrF 248 nm laser radiation for in-fiber FBG fabrication. In one particular example of this particular embodiment, core 35 has an index of refraction equal to about 1.45, inner cladding 40 has an index of refraction equal to about 1.445, and outer cladding 45 has an index of refraction equal to about 1.44. In addition, in another specific example, core 35 has an elliptical shape with an 8 μm major axis and a 5 μm minor axis, inner cladding 40 has an outer diameter equal to about 105 μm, and outer cladding 45 has an outer diameter equal to about 125 μm. Alternatively, outer cladding 45 may be made of a polymer such as clear silicone or PFA. Preferably, core 35 is a polarization-maintaining ellipse with a beat length of less than 4 mm at 1550 nm to ensure high sensing sensitivity and to reduce polarization phase noise. Other core and cladding sizes and shapes are possible without limitation.

Referring to FIGS. 2A and 2B, optical fiber 30 includes an in-fiber optic component 55 such as, for example, an FBG (shown in FIG. 2A). In addition, an optical transducing element is located in a position that is proximate to a portion of optical fiber 30. In the embodiment shown in FIGS. 2A and 2B, the optical transducing element is a light absorbing thermal coating 60 provided around at least a portion of and preferably the entirety of the outer circumference of optical fiber 30 (FIG. 2A shows thermal coating 60 in partial cut-away to enable viewing of the other components of optical fiber 30). According to one particular embodiment, thermal coating 60 is a metal film, such as, for example, a silver, nickel, titanium or other light absorbing metal film, that is deposited on the outside of optical fiber 30 (protective layer 50 is removed at this location for reasons that will be clear below and thermal coating 60 is applied to outer cladding 45) by any one of many known coating methods such as plating, sputtering and e-beam thermal evaporation. The thickness of thermal coating 60 is preferably on the order of about 10 nm to tens of microns. A key characteristic of thermal coating 60 is that is heats up and radiates and/or conducts heat when exposed to certain types of light from inside optical fiber 30. Other suitable materials such as, without limitation, light absorbing polymers, carbon, semiconductors, ceramics, light absorbing doped glasses, metal films of any kind, metal oxides, metal nitrides, and metal carbides, may be used for thermal coating 60.

Referring to FIG. 2A, optical fiber 30 also includes an optical tap region 65 located in a portion of optical fiber 30 that is proximate to thermal coating 60. Optical tap region 65 is a region of optical fiber 30 that will allow certain light, as described in greater detail below, that is propagating through optical fiber 30 to leak out of (i.e., be released from) optical fiber 30 and be absorbed by thermal coating 60. Optical tap region 65 may be created in a number of ways. For example, laser techniques or ion-implantation techniques may be used to, in effect, damage inner cladding 40 in a selected region and thereby alter its index of refraction such that the power light 75 will leak out of inner cladding 40 at optical tap region 65. It is estimated that an index change of about $5 \times 10^{-3}$ to $1 \times 10^{-2}$ through outer cladding 45 will be sufficient to release the power light 75.

Preferably, a combination of deep UV laser radiation and ion implantation are used to fabricate optical tap region 65. Compaction produced by deep UV laser radiation in germanium doped cores such as core 35 produces stress in the core-cladding interface, which eventually damages the interface region and produces leaking light. For example, a combination of 157 nm $F_2$ vacuum UV lasers and 248 nm KrF deep UV lasers based on type II photosensitivity response may be used to fabricate long-period grating type optical taps. KrF lasers are well suited for fabrication of uniform optical taps for optical tap region 65 due to the relatively weak absorption of such laser light by germanosilica waveguide cores such as core 35. The type II photosensitivity can be enhanced by using known hydrogen loading techniques. In addition, anisotropic optical taps for optical tap region 65 with highly directional leaking light can readily be fabricated with 157 nm $F_2$ laser radiation. Anisotropic optical taps are convenient for leaking light collection and refocusing. For example, highly anisotropic diffused light can be easily line-focused to generate acoustic waves for active ultrasonic sensing.

Furthermore, using an amplitude mask, the pulse fluence of the optical tap fabricating laser(s) can be tailored along fiber 30 to achieve a uniform leaking light intensity. Angular uniformity of an optical tap fabricated by deep UV laser radiation can be obtained by rotating fiber 30 during laser exposure. By adjusting pulse fluence and accumulated fluence of the lasers, optical taps can be fabricated with desired tap lengths, leaking percentages, and emitting directionalities.

With respect to ion implantation, the magnitude and location of an index of refraction change in a fiber can be precisely controlled by the selected ion species, ion energy, and total ion dose. As such, the optical damage can be localized between the surface and the interface of the inner cladding 40 and the outer cladding 45. It has been learned, for example, that 21-MeV Si and 12-MeV C ions produce uniform vacancy profiles and thus uniform index profiles, while ) 0.8-MeV H ions produce vacancies that are concentrated at the end of the implantation trajectory.

Alternatively, blazed Bragg gratings may be used to implement optical tap region 65 by providing a blazed grating in a core of a fiber such as core 35 shown in FIGS. 2A and 2B or in the core of a single mode fiber similar to single mode fiber portion 85 in a location that is near the thermal coating such as thermal coating 60 or 115. In such an application, both the power light and the sensing/signal light are propagated through the same core. As is known in the art, blazed Bragg gratings are fiber gratings that have grating planes that are at an angle (<90 degrees) with respect to the longitudinal axis of the fiber in which they are created. The angled nature of the gratings causes the light reflected by the blazed Bragg grating (the resonance wavelength) to be reflected at an angle with respect to the longitudinal axis of the fiber. This light (the power light) will be coupled out of the fiber core, into the surrounding cladding, and out of the fiber, where it may be absorbed by a thermal coating such as thermal coating 60 or 115. The particular blazing angles and the degree of change of the index of refraction will determine the out-coupling efficiency, and the period of the grating will determine the out-coupling wavelength.

Figure 1:
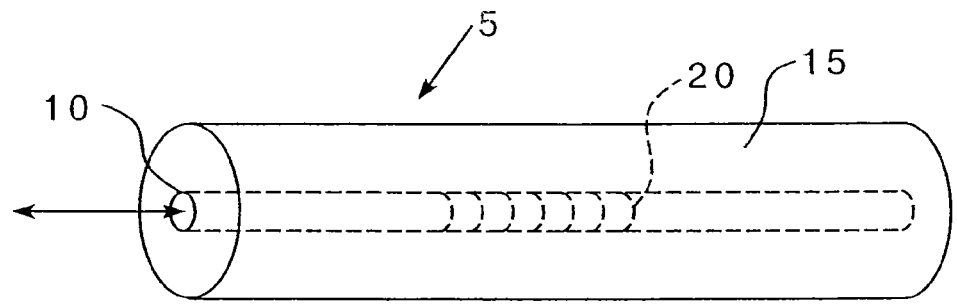
FIG. 1 is a side view of a prior art optical fiber including a Fiber Bragg Grating.

In operation, as illustrated in FIGS. 2A and 2B, a sensing light 70 is directed through and propagates through core 35. Sensing light 70 may be, for example, 1300 to 1700 nm light generated by a diode laser, such as a swept tunable laser, or a broadband source. Although the term sensing light is used herein for illustrative purposes, it will be appreciated that sensing light 70 may also be a signal propagating light used in, for example, a fiber optic communication system, and the term sensing light or sensing/signal light is intended to include signal propagating or similar lights. As is known in the art and as described elsewhere herein, sensing light 70 will propagate through core 35 and encounter in-fiber optic component 55, which, in the embodiment shown in FIG. 2A, is an FBG, and a particular resonance wavelength will be reflected back in the opposite direction. This functionality is essentially the same as described in connection with the prior art FBG shown in FIG. 1. According to an aspect of the present invention, power light 75 is simultaneously directed through both core 35 and inner cladding 40 (although power light 75 is shown propagating in a direction opposite the sensing light 70, it may also be propagated in the same direction as sensing light 70). Power light 75 may be, for example, light generated from a high-power diode laser array (not shown). Preferably, power light is on the order of 0.1 to hundreds of watts with a wavelength of between 600 nm and 1600 nm. Power light 75 will, as seen in FIGS. 2A and 2B, propagate through core 35 and inner cladding 40 and will be confined therein until it reaches optical tap region 65. When power light 75 reaches optical tap region 65, at least a portion of power light 75 will leak out of inner cladding 40 and into outer cladding 45. The portion of power light 75 that has leaked into outer cladding 45 will then be transmitted substantially radially outwardly therefrom and will ultimately be absorbed by thermal coating 60. The absorption of power light 75 will cause the temperature of thermal coating 60 to increase. As a result, thermal coating 60 will then radiate heat that is transmitted/conducted through outer cladding 45 and inner cladding 40 and into core 35. The heat in core 35 heats the in-fiber optic component 55. As is known, this heat will change (increase) the index or indexes of refraction of in-fiber optic component 55 and will, to an extent, change the size of (make larger) optical fiber 30, each of which will alter the characteristics of in-fiber optic component 55. In the case of an FBG as shown in FIG. 2A, these changes, resulting from the power light 75, will alter the resonance wavelength of the FBG. Thus, power light 75 may be used to power and tune the in-fiber optic component 55 provided in optical fiber 30. As will be appreciated, the intensity and/or duration of power light 75 may be controlled to selectively heat thermal coating 60 to produce particular changes in the in-fiber optic component 55 (e.g., particular resonance wavelengths).

Figure 4A:
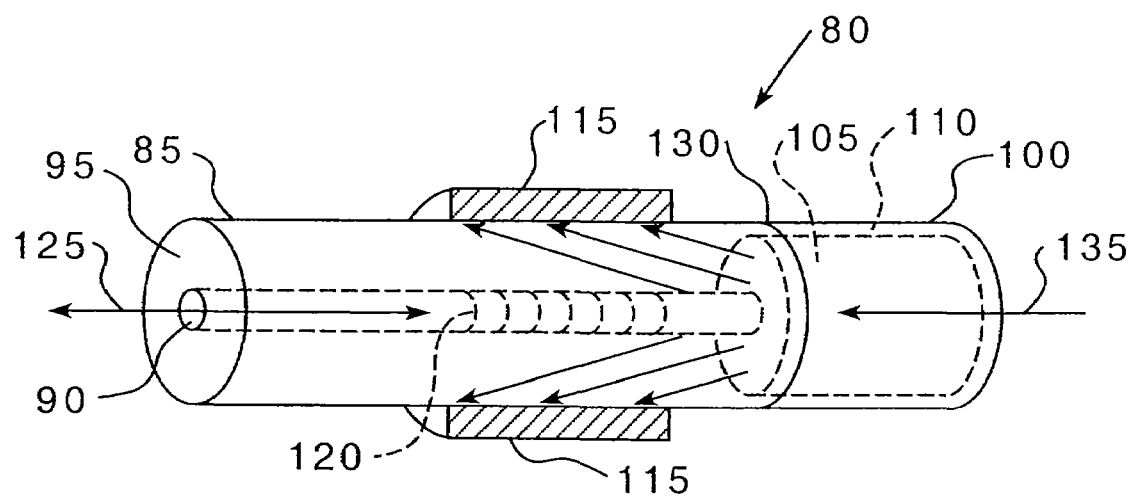
FIGS. 4A and 4B are a partial cross-sectional side view and a side view, respectively, of an optical fiber having a tunable in-fiber optic component according to an alternate embodiment of the present invention.
Figure 4B:
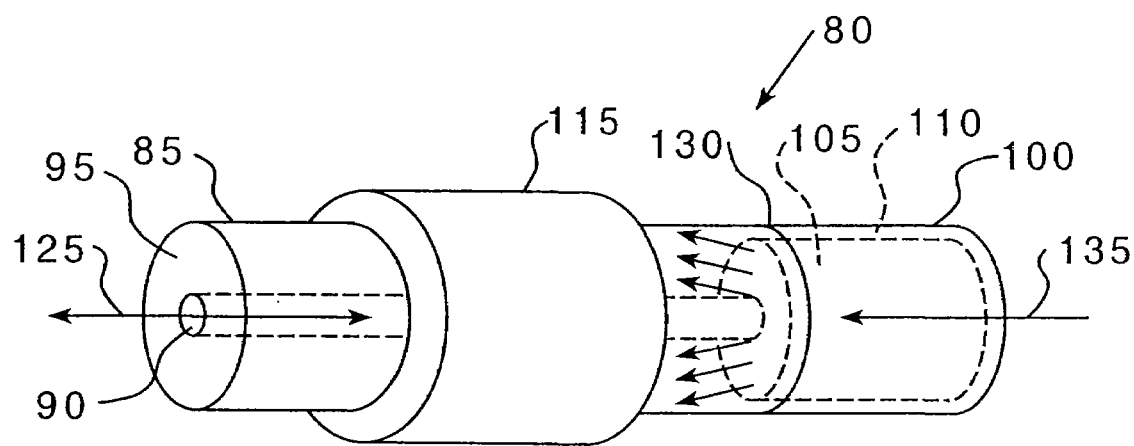

FIGS. 4A and 4B are side views (4A in partial cross-section) of optical fiber 80 according to an alternate embodiment of the present invention. Optical fiber 80 includes single mode fiber portion 85 having core 90 and cladding 95 that is joined to, such as by fusion splicing, multi-mode fiber portion 100 having core 105 and cladding 110. Single mode fiber portion 85 may be any known, commercially available single mode optical fiber material, and multi-mode fiber portion 100 may be any known, commercially available multi-mode optical fiber material. Optical fiber 80 includes an optical transducing element in the form of thermal coating 115 which is similar in structure to thermal coating 60 shown in FIGS. 2A and 2B. Optical fiber 80 also includes in-fiber optic component 120, which, in the embodiment shown in FIGS. 4A and 4B, is a uniform FBG, but may also be other types of optic components as described herein. A sensing light 125 is directed through core 90 as shown. Single mode fiber portion 85 and multi-mode fiber portion 100 are joined to one another at junction 130. As shown in FIGS. 4A and 4B, junction 130, and in particular the differing diameters of core 90 and core 105, acts as an optical tap region that allows power light 135 that is directed through and propagates through core 105 to leak out of core 105 and into cladding 95, where it is ultimately absorbed by thermal coating 115. As described in connection with FIGS. 2A and 2B, the absorbed power light 135 heats thermal coating 115 which in turn radiates heat that is conducted therefrom and heats in-fiber optic component 120, thereby changing the operating characteristics thereof.

Figure 5A:
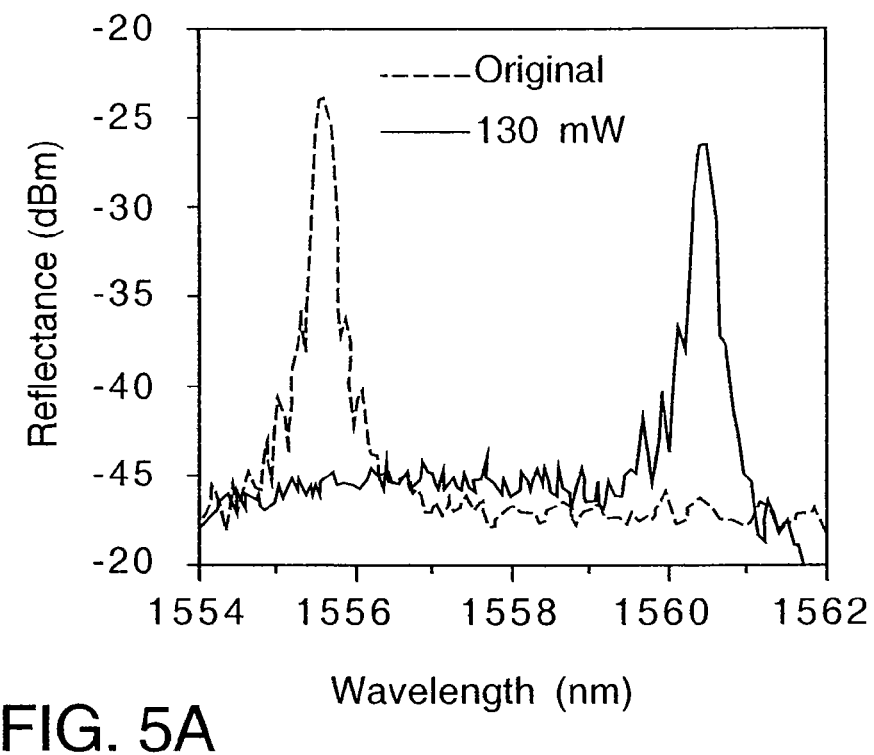
FIG. 5A is a graph illustrating a reflection spectrum shift and FIG. 5B is a graph illustrating a spectrum shift as a function of power light of a particular implementation of the optical fiber shown in FIGS. 4A and 4B.
Figure 5B:
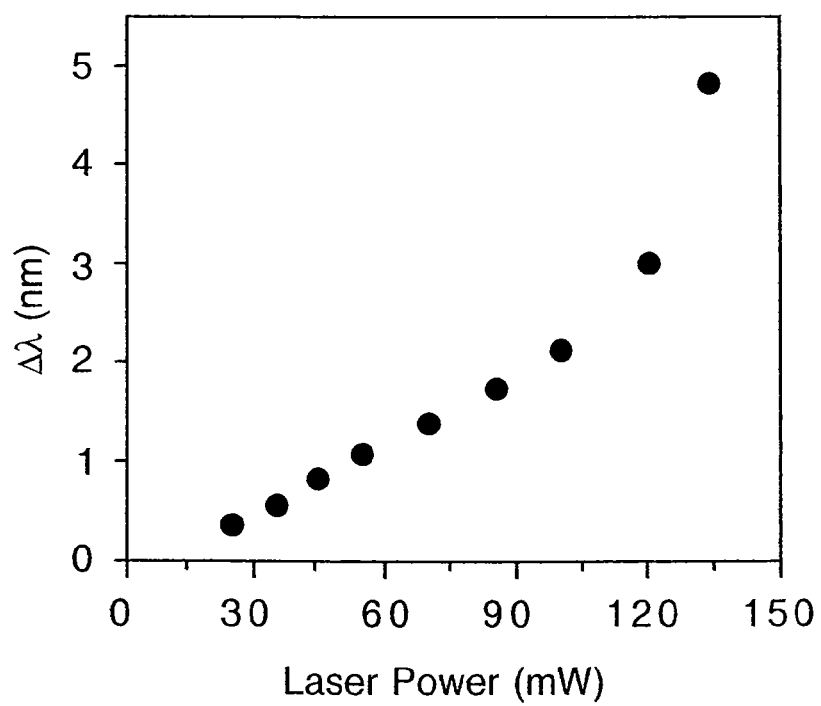

In one particular implementation investigated by the inventor, in-fiber optical component 120 consisted of several 4 mm long and 4 cm long uniform FBGs and several 4 cm long linear chirped FBGs (1 nm/cm) written into single mode fiber portion 85, which consisted of an SMF-28 fiber available from Corning Incorporated of Corning, N.Y. Single mode fiber portion 85 in this implementation consisted of a 125 µm diameter (9 µm core) fiber, and multi-mode fiber portion 100 consisted of a 140 µm diameter (100 µm core) fiber. Thermal coating 115 consisted of a 2 µm thick silver film that was positioned approximately 5 mm from junction 130. Ten watts of 910 nm laser light from a high power diode laser array was coupled into the end of multi-mode fiber portion 100 using a pair of 20× microscope objectives. The 910 nm light (power light 135) propagated through core 105 of multi-mode fiber portion 100 and leaked into cladding 95 of single mode fiber portion 85 through junction 130. The leaking power light 135 was absorbed by thermal coating 115 and raised the temperature of in-fiber optic component 120. The reflection spectra of the in-fiber optic component 120 was monitored with an optical spectrum analyzer. FIG. 5A shows a spectrum evolution of a 4 mm uniform FBG forming part of in-fiber optic component 120 heated with the power light 135 as just described. It was estimated that approximately 130 mW of power light 135 was leaked through to thermal coating 115, raising the temperature of in-fiber optic component 120 significantly and shifting the resonance wavelength as shown in FIG. 5A. FIG. 5B shows the resonance wavelength shift as a function of the input diode laser power (power light 135).

Figure 6:
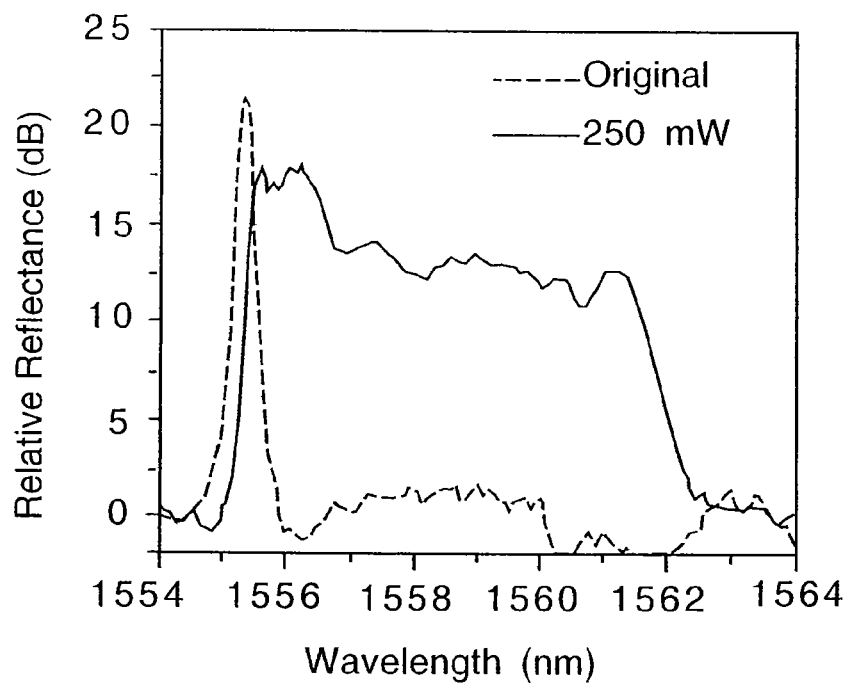
FIG. 6 is a graph illustrating a reflection spectrum expansion of a particular implementation of the optical fiber shown in FIGS. 4A and 4B.
Figure 7:
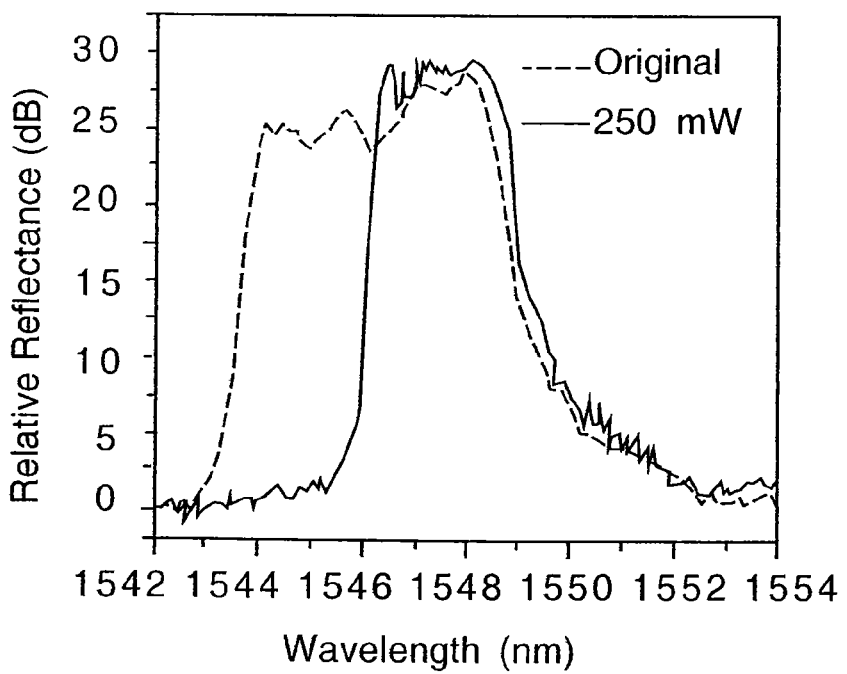
FIG. 7 is a graph illustrating a reflection spectrum compression of a particular implementation of the optical fiber shown in FIGS. 4A and 4B.

In addition, as will be appreciated, the energy of power light 135 leaking out of core 150 and being transmitted through cladding 95 falls exponentially with distance (assuming a constant loss coefficient). Thus, a temperature gradient is created along the length of thermal coating 115. In some cases, this temperature gradient is longer than the FBGs forming a part of in-fiber optic component 120. This gradient modifies the spectrum response of the FBGs and may be used to control the grating chirp and cause a spectrum stretch of the 4 cm long uniform FBG forming a part of in-fiber optic component 120. FIG. 6 shows a spectrum width stretch of a 4 cm long uniform FBG when 250 mW of diode laser light (power light 135) was directed through core 105 of multi-mode fiber portion 100 (it was estimated that approximately 120 mW of power light 135 leaked). FIG. 7, on the other hand, shows a spectrum width compression of the 4 cm linear chirped grating forming part of in-fiber optic component 120 when a 250 mW diode laser light was utilized as power light 135. In this situation, the temperature gradient created by power light 135 "de-chirped" the linear chirped grating and compressed the spectrum width.

Figure 8:
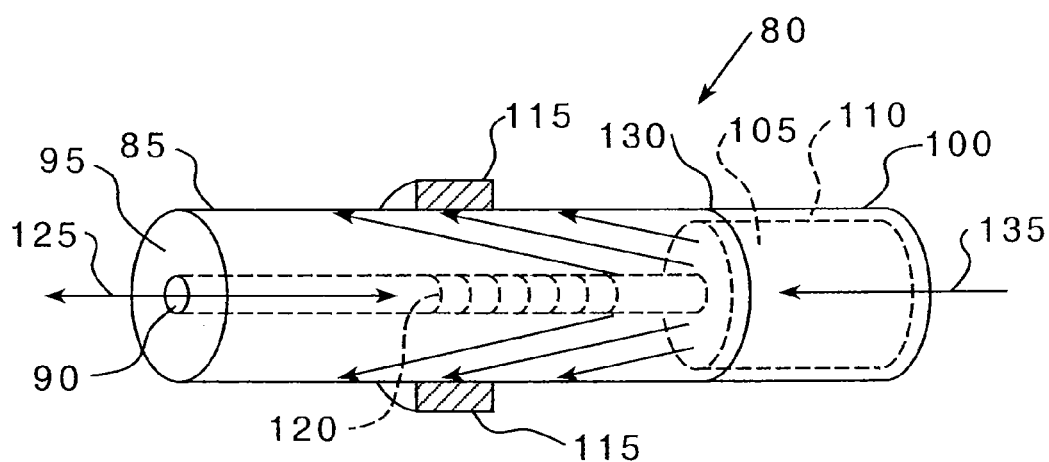
FIG. 8 is a partial cross-sectional side view of an optical fiber having a tunable in-fiber optic component according to a further alternate embodiment of the present invention.
Figure 9:
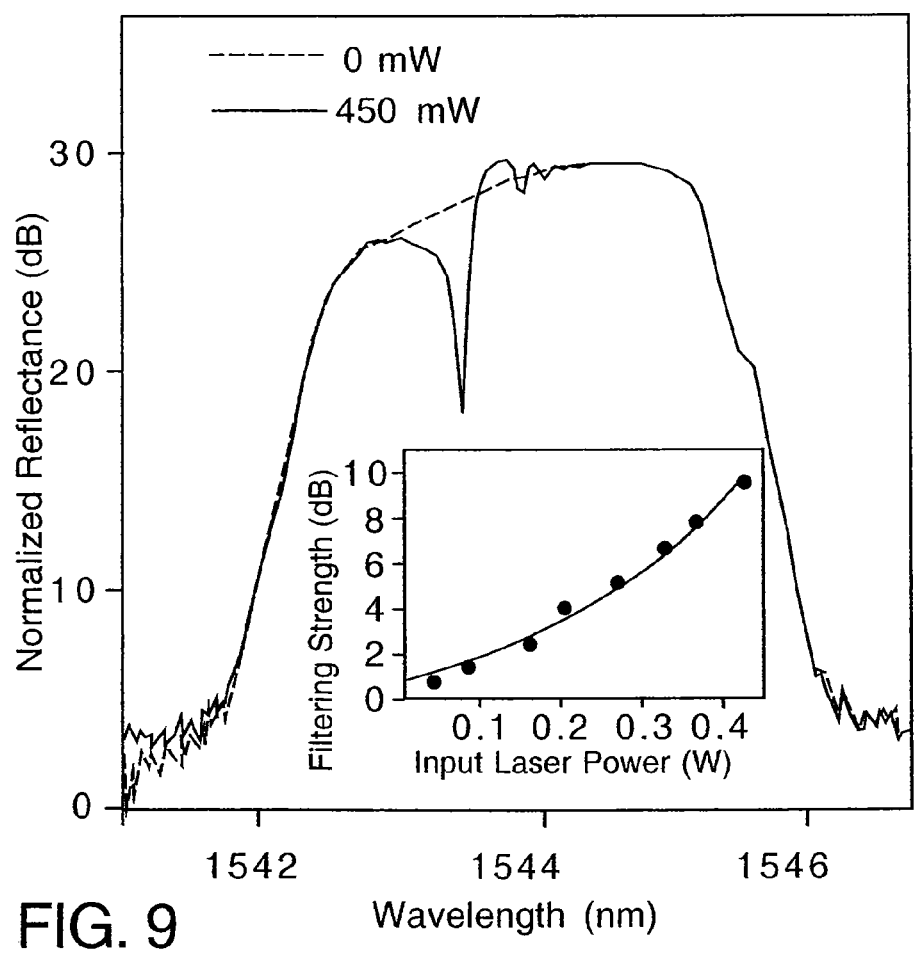
FIG. 9 is a graph illustrating the notch filter characteristics of an implementation of the optical fiber shown in FIG. 8.

According to a further alternate embodiment of the present invention, shown in FIG. 8, a small local refractive index change may be produced by generating a "hot spot" to modify the reflection spectrum of a chirped FBG. Specifically, in-fiber optical component 120 is, in this embodiment, a 4 cm long linear chirped FBG (1 nm/cm), and thermal coating 115 is an approximately 2 mm long silver film. In one implementation investigated by the inventor, the power light 135 was approximately 450 mW of 910 nm diode laser light. Power light 135 heated thermal coating 115, which in turn heated in-fiber optic component 120, thereby increasing the local refractive index of the portion of in-fiber optic component 120 near thermal coating 115 and expanding the grating period or periods. As a result, the resonance wavelength of the in-fiber optic component 120 at this point increased. As shown in FIG. 9, this localized heating created a notch filter in the FBG reflection spectrum.

Figure 10A:
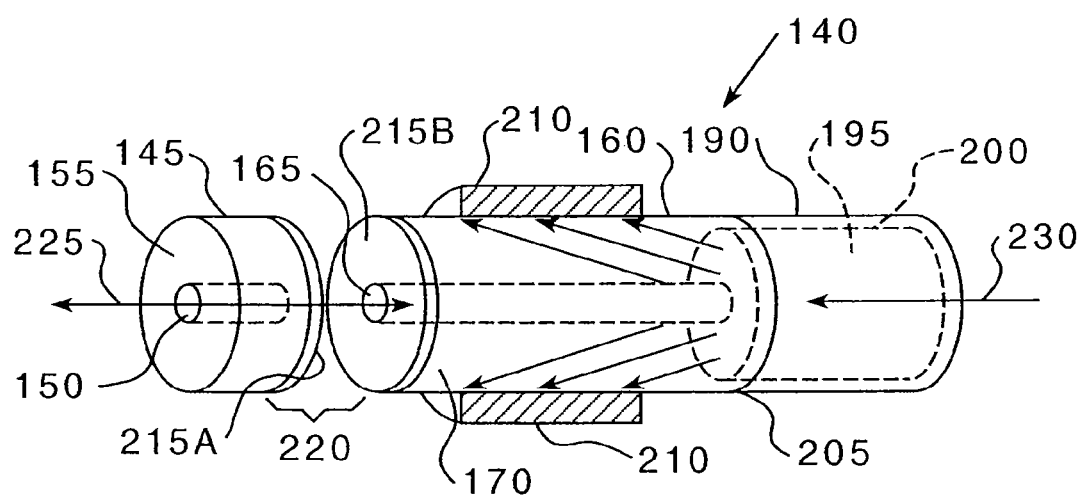
FIGS. 10A and 10B are a partial cross-sectional side view and a side view, respectively, of a fiber optic system according to a further alternate embodiment of the present invention.
Figure 10B:
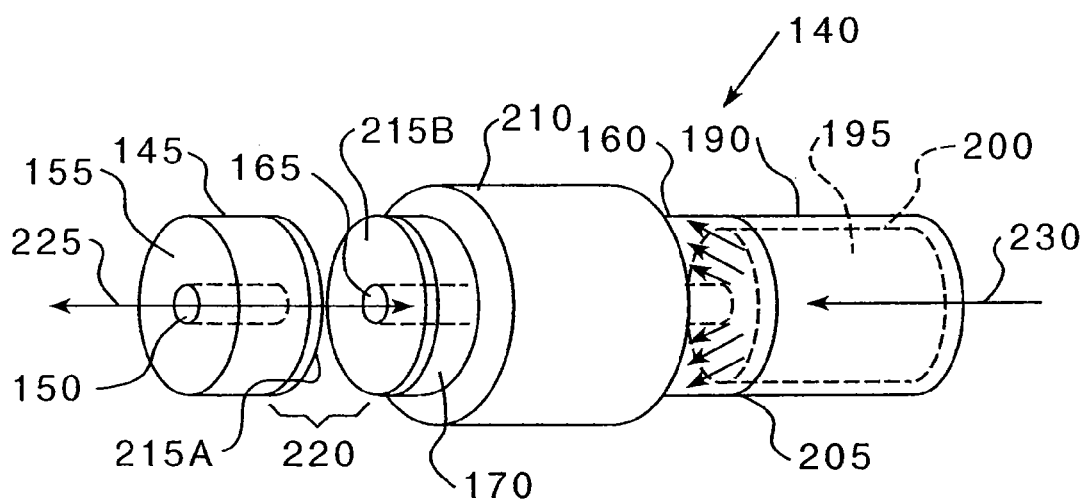

FIGS. 10A and 10B are side views of optical fiber system 140 according to still a further alternate embodiment of the present invention. As described below, optical fiber system 140 provides a dynamic Fabry-Perot micro-cavity resonator. Fiber optical Fabry-Perot micro-cavity resonators are utilized as an important optical component in fiber optic communication networks and fiber optic sensing systems. The present invention, among other applications, may be utilized to either stabilize the reflection spectrum of a Fabry-Perot micro-cavity resonator from random temperature or stress-induced drifting or to introduce a periodic phase change to the cavity for phase-locking signal detection. As seen in FIGS. 10A and 10B, optical fiber system 140 includes first single mode fiber portion 145 having core 150 and cladding 155. Optical fiber system 140 also includes second single mode fiber portion 160 having a core 165 and cladding 170 that is joined to, such as by fusion splicing, multimode fiber portion 190 having core 195 and cladding 200. Optical fiber system 140 includes an optical transducing element in the form of thermal coating 210 which is similar in structure to thermal coating 60 shown in FIGS. 2A and 2B. Thermal coating 210 is provided around at least a part of, and preferably the entirety of, the circumference of second single mode fiber portion 160.

As is known in the art, a Fabry-Perot filter is a high-spectral resolution (narrow-band-pass) optical filtering device that operates on the property of destructive light interference. A Fabry-Perot filter includes a cavity bounded on each side by two generally flat, transparent plates that have a partially reflective coating provided thereon. Typically, the cavity is filled with a dielectric material, which may include, without limitation, air. Incident light is passed through the two coated reflecting plates. The distance between the reflective coatings determines which wavelengths will destructively interfere and which wavelengths will be allowed to pass through the coated plates. In addition, the optical transmission spectrum of a Fabry-Perot filter typically shows multiple peaks with narrow passband width. The spacing between neighboring peaks is primarily determined by the gap between the two reflecting plates that form the cavity and the dielectric function of the material present in the cavity. As seen in FIGS. 10A and 10B, a partially reflective plate 215A is provided at the end of the first single mode fiber portion 145 and a partially reflective plate 215B is provided at the end of the second single mode fiber portion 160 opposite partially reflective plate 215A such that a cavity 220 is provided therebetween.

Figure 11:
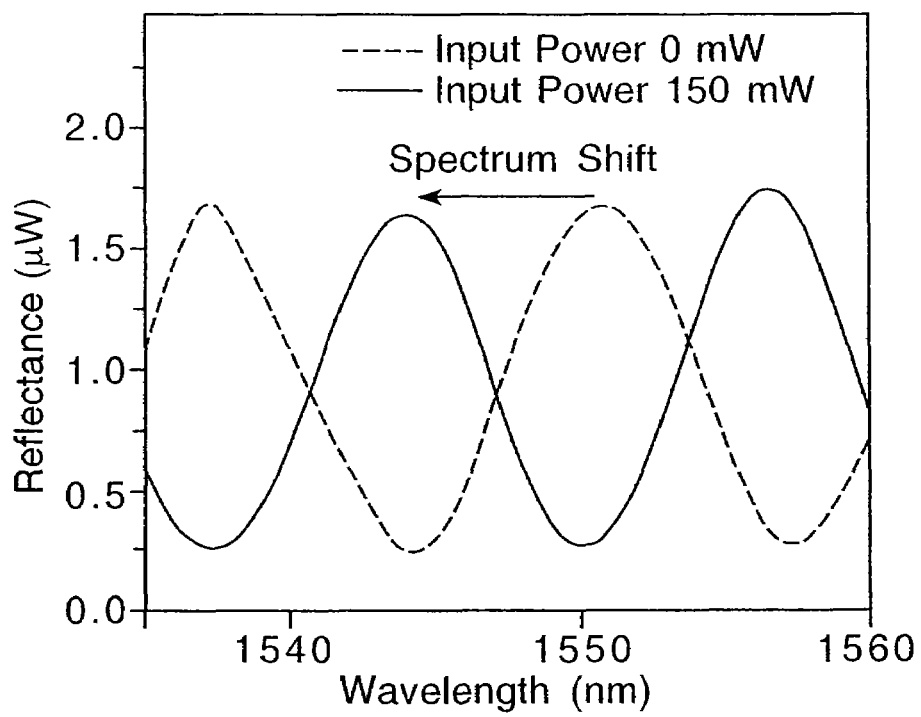
FIG. 11 is a graph illustrating a spectrum shift of an implementation of the fiber optic system shown in FIGS. 10A and 10B.

A sensing light 225 is directed through core 150 as shown in FIGS. 10A and 10B. Second single mode fiber portion 160 and multimode fiber portion 190 are joined to one another at junction 205. As shown in FIGS. 10A and 10B, junction 205, and in particular the different diameters of core 165 and core 195, act as an optical tap region that allows power light 230 that is directed through and propagates through core 195 to leak out of core 195 and into cladding 170, where it is ultimately absorbed by thermal coating 210. The absorbed power light 230 heats thermal coating 210, which in turn heats second single mode optical fiber 160. The heating of second single mode fiber 160 causes its length to increase, thereby decreasing the width of cavity 220 and changing the characteristics of the Fabry-Perot filter implemented by partially reflective plates 215A and 215B and cavity 220. In particular, the addition of power light 230 will cause the reflection spectrum of sensing light 225 to be shifted as demonstrated in FIG. 11.

Real-time gas and liquid flow sensing has many important applications in, for example, aerodynamics, combustion engine design, medical devices (such as respiratory devices) and chemical analysis. At present, state-of-the-art flow sensors are mostly based on MEMS technology. Although MEMS-based devices have been found to be effective, the packaging cost is relatively high, the packaged devices are typically relatively bulky, and they rely on external electrical power. As a result, the implementation of MEMS-based flow sensors in small diameter flow tubes (as required in respiratory devices) and in harsh environments is currently not feasible.

As an alternative, according to another aspect of the present invention, a tunable (active) optical fiber system including an FBG type in-fiber optic component powered by in-fiber light such as is shown in FIGS. 2A and 2B or 4A and 4B may be utilized to sense real-time gas and liquid (fluid) flow. In particular, if the FBG comprising in-fiber optic component 55 (FIGS. 2A and 2B) or in-fiber optic component 120 (FIGS. 4A and 4B) is heated as described herein such that the temperature thereof is higher than the surrounding environment, and if a gas or liquid is caused to flow past the associated optical fiber 30 or 80, the thermal energy removed from the FBG (in-fiber optic component 55 or 120) as represented by the resulting temperature change will depend on the flow rate of the surrounding gas or liquid. As a result, the flow rate can be measured by measuring the resonance wavelength shift(s) of the FBG that, as described above, are dependent upon FBG temperature changes. Resonance wavelength shifts due to fluid flow may be correlated to flow rates using known methods.

Figure 12:
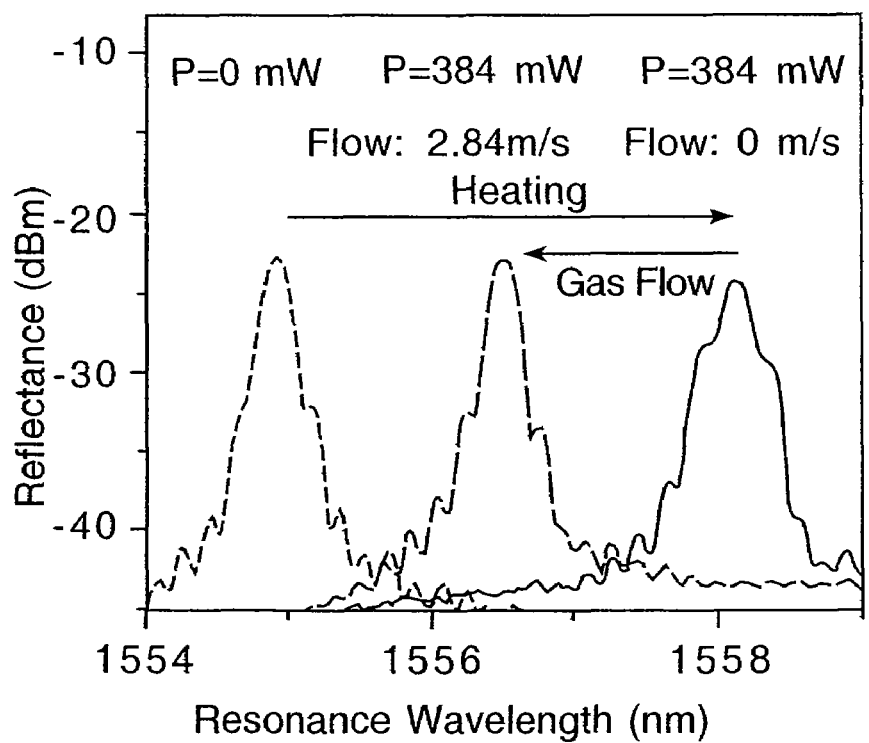
FIG. 12 is a graph illustrating operation of a fluid flow sensor according to an aspect of the present invention.

In one example implemented by the inventor, optical fiber 30 was provided with an in-fiber optic component 55 consisting of a 5 mm uniform FBG having a resonance wavelength of about 1553.7 nm at room temperature as shown in FIG. 12. Power light 75 consisting of 384 mW diode laser light was then provided, causing the resonance wavelength of the FBG to shift to about 1558.2 nm as shown in FIG. 12. Air was then caused to flow around optical fiber 30 at about 2.84 m/s, which cooled optical fiber 30 down and removed heat from the FBG, thereby causing another shift in the resonance wavelength to about 1556.6 nm as shown in FIG. 12.

Figure 13:
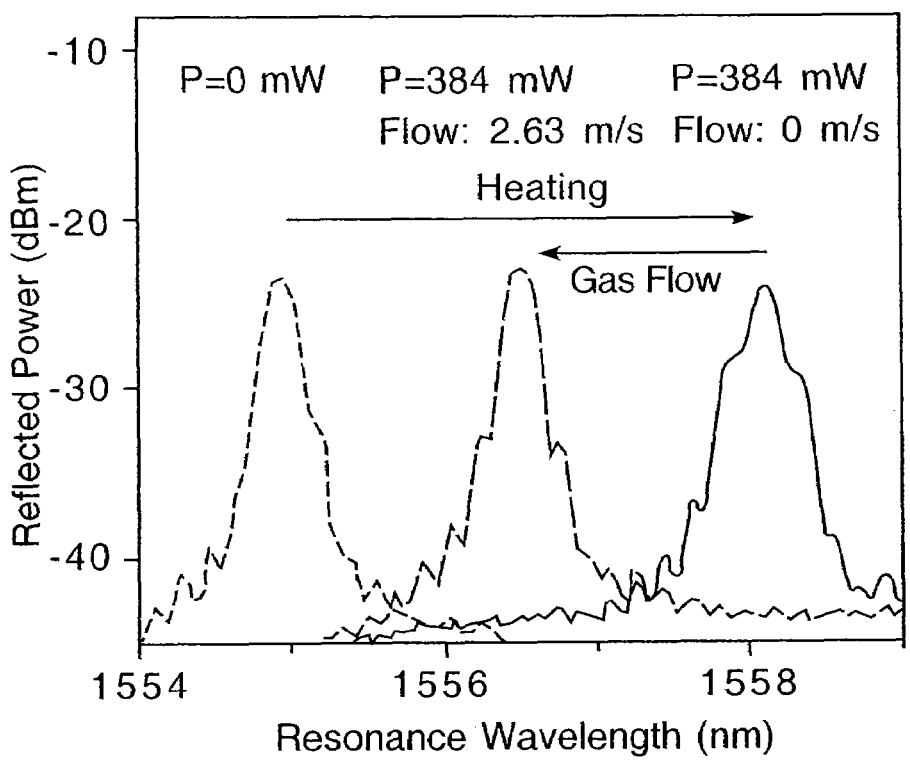
FIG. 13 is a graph illustrating operation of a flow sensor according to another aspect of the present invention.
Figure 14:
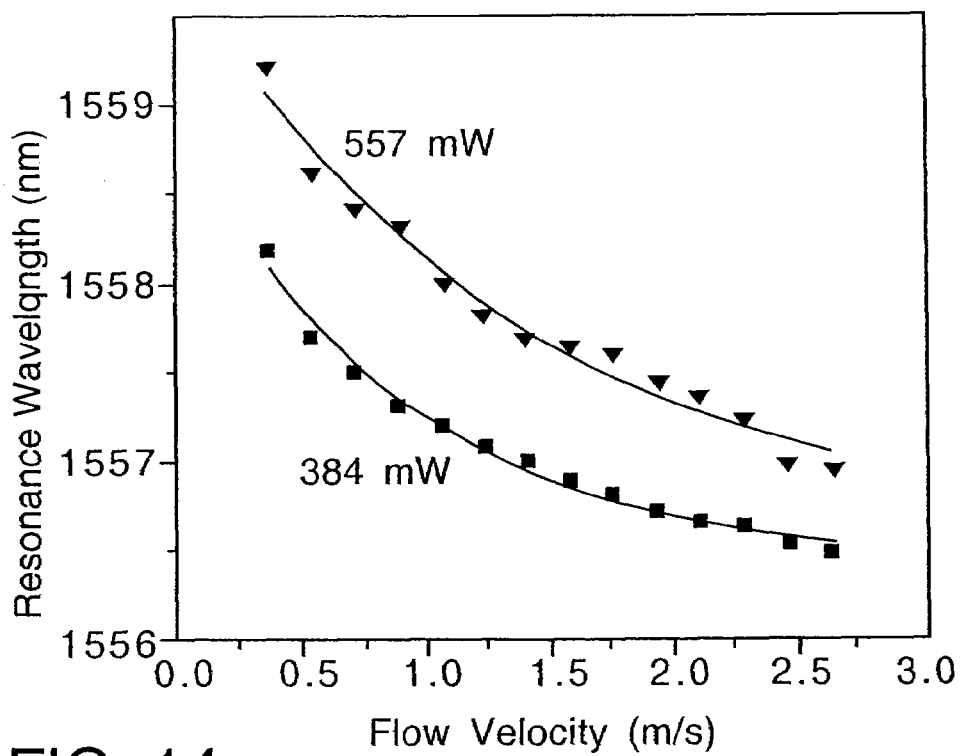
FIG. 14 is a graph that shows the resonance wavelength shifts as a function of fluid flow velocity of the flow sensor the operation of which is demonstrated in FIG. 13.
Figure 15:
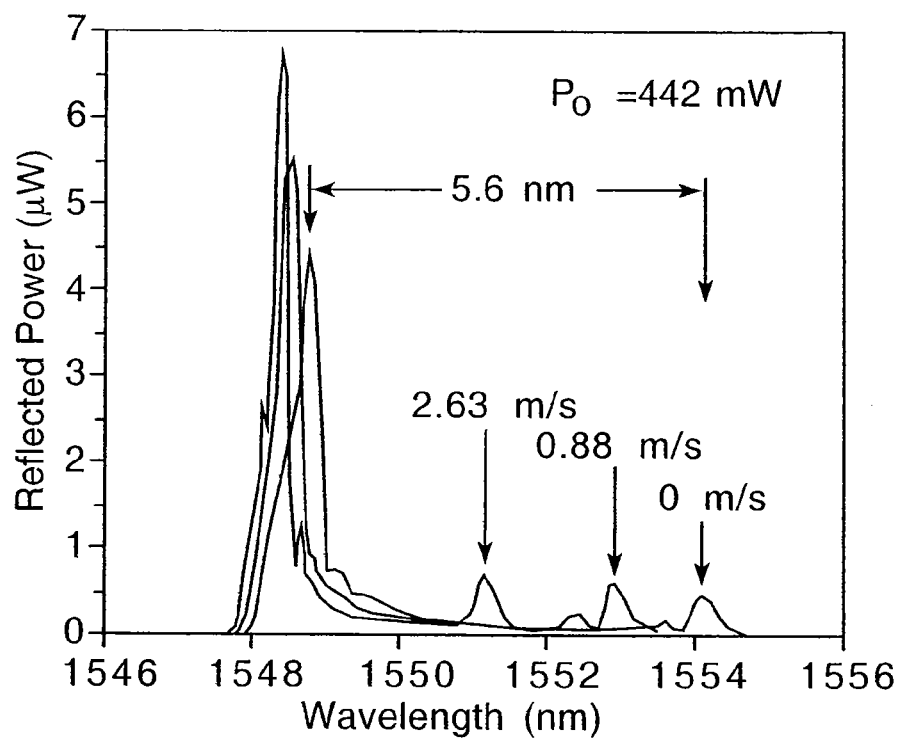
FIG. 15 is a graph that shows the spectral evolution of a particular flow sensor according to the present invention.
Figure 16:
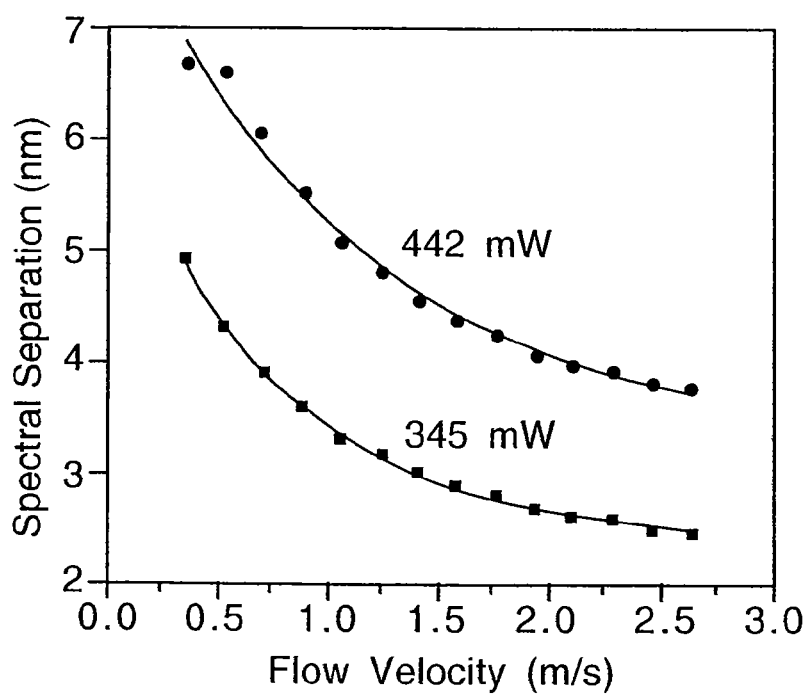
FIG. 16 is a graph that shows the spectral separation produced by a particular fluid flow sensor according to the present invention.

In another example implemented by the inventor, optical fiber 30 was provided with an in-fiber optic component 55 consisting of a 5 mm uniform FBG having a resonance wavelength of about 1554.9 nm at room temperature as shown in FIG. 13. Power light 75 consisting of 384 mW diode laser light was then provided, causing the resonance wavelength of the FBG to shift to about 1558.2 nm as shown in FIG. 13. $N_2$ was then caused to flow around optical fiber 30 in a direction perpendicular to the FBG at about 2.63 m/s, which cooled optical fiber 30 down and removed heat from the FBG, thereby causing another shift in the resonance wavelength to about 1556.5 nm as shown in FIG. 13. FIG. 14 shows the resonance wavelength shifts of the 5 mm uniform FBG as a function of flow velocity using a power light 75 at two different levels, 384 mW and 557 mW. As seen, the resonance wavelength shifts closely follow a simple exponential decay function of the $N_2$ velocity. Similar flow measurements were also carried out on an in-fiber optic component 55 consisting of a 1.7 cm uniform FBG having a resonance wavelength of about 1538.3 nm at room temperature. As discussed elsewhere herein, the magnitude of leaking power light 75 falls off exponentially with distance from the junction 130, thereby causing a temperature gradient in longer FBG such as the 1.7 cm uniform FBG just described. FIG. 15 shows the spectral evolution of such a 1.7 cm uniform FBG heated with a 442 mW power light 75 under $N_2$ flow velocities of 0.88 m/s and 2.63 m/s. FIG. 16 shows the spectral width of the 7 cm uniform FBG as a function of flow velocity using a power light 75 at two different levels, 345 mW and 442 mW. As seen in FIG. 16, the spectral widths decrease exponentially with the increase in flow velocity.

Figure 17:
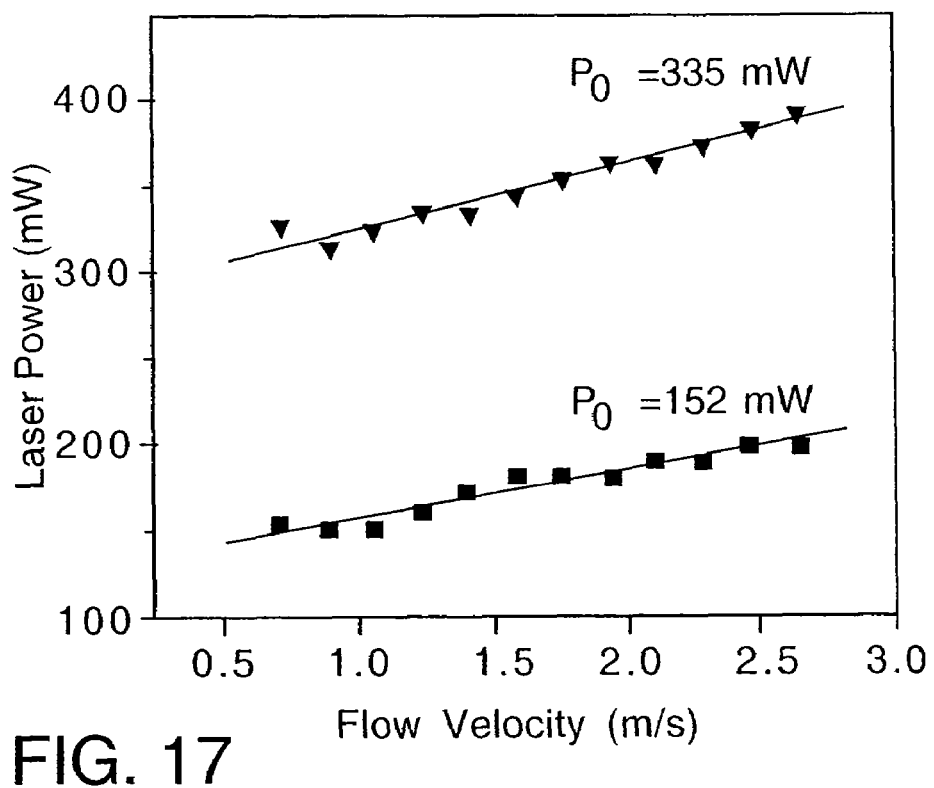
FIGS. 17 and 18 are graphs that demonstrate the operation of a particular fluid flow sensor according to the present invention in a constant wavelength (variable power) mode.
Figure 18:
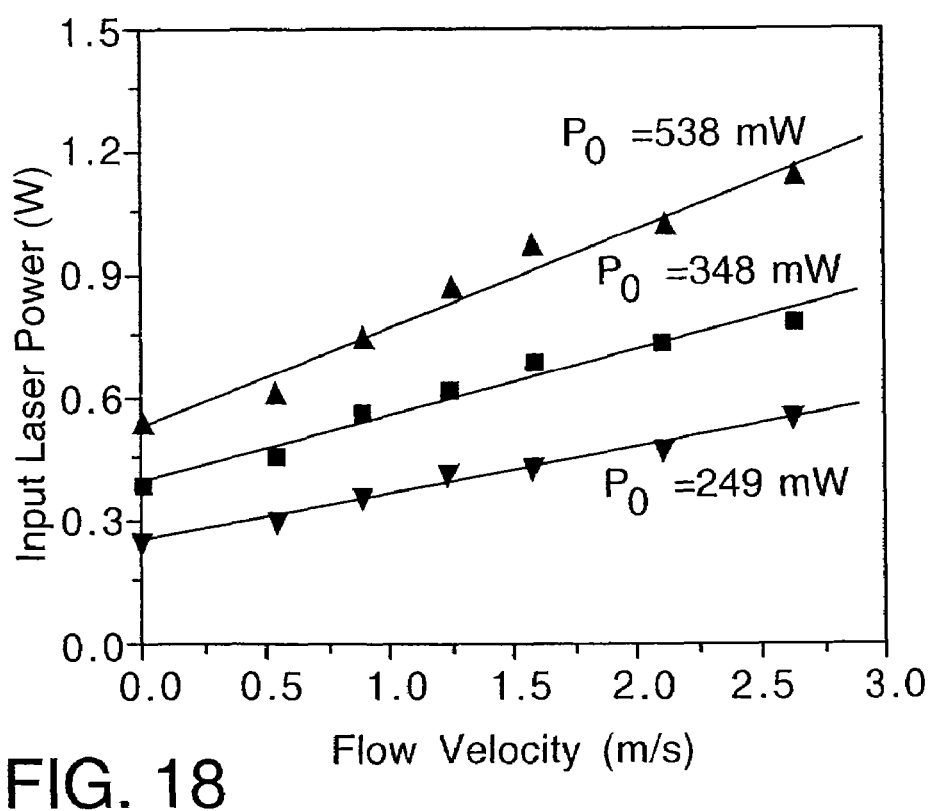

In addition, as will be appreciated, such a flow sensor may be operated in a constant power mode or a constant wavelength mode. In the constant power mode, a power light 75 or 135 having a constant power level is provided, and, as just described, flow rate is measured based on resonance wavelength shifts. In contrast, in the constant wavelength mode, flow rate is measured based on the power level(s) of power light 75 or 135 that is/are required to keep the resonance wavelength of the FBG constant (equal to some pre-set, pre-flow value) when liquid or gas flows thereby. FIGS. 17 and 18 demonstrate operation in the constant wavelength (variable power) mode. Specifically, FIG. 17 shows the power levels of power light 75 that are required to maintain a constant resonance wavelength at various flow velocities with initial power light levels of 152 mW and 335 mW using the 1.7 cm uniform FBG described above. Similarly, FIG. 18 shows the power levels of power light 75 that are required to maintain a constant resonance wavelength at various flow velocities with initial power light levels of 249 mW, 348 mW and 538 mW using the 5 mm uniform FBG described above. As seen in FIGS. 17 and 18, the power levels needed to maintain a constant, pre-set resonance wavelength follow linear functions with the flow velocity.

Figure 19:
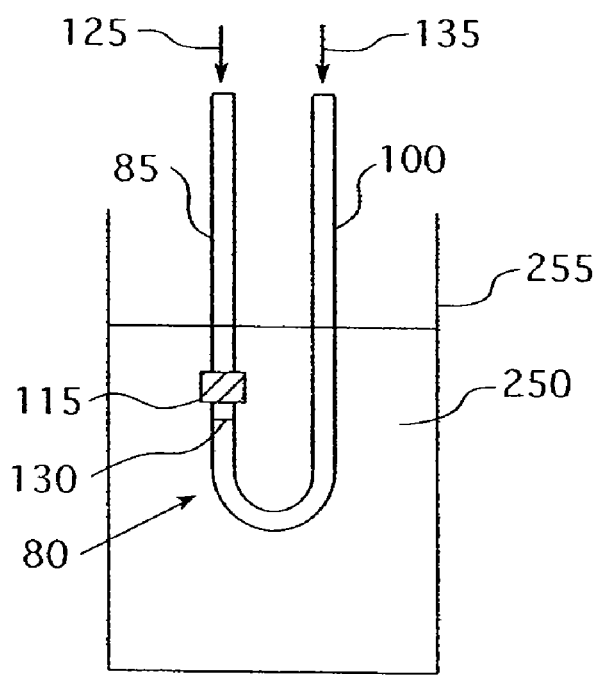
FIG. 19 is a schematic diagram of a tunable (active) optical fiber system including an FBG type in-fiber optic component powered by in-fiber light that may be utilized as a liquid level sensor according to a further aspect of the present invention.
Figure 20:
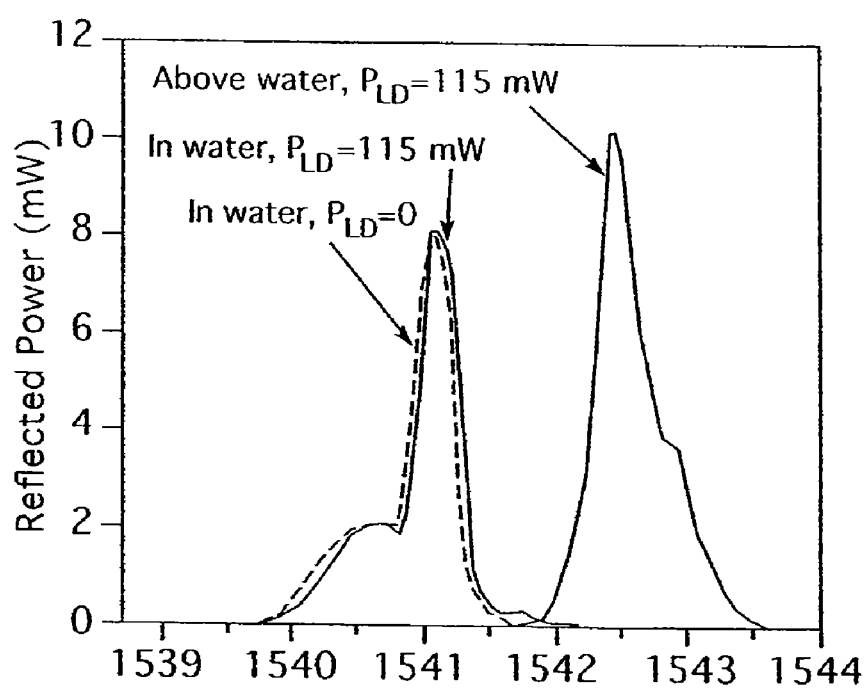
FIG. 20 is a graph that shows the spectral response of the FBG of the optical fiber system of FIG. 19 under certain conditions.

As a further alternative, according to yet another aspect of the present invention, a tunable (active) optical fiber system including an FBG type in-fiber optic component powered by in-fiber light such as is shown in FIGS. 2A and 2B or 4A and 4B may be utilized as a liquid level sensor to monitor the level of a liquid in a container, such as, for example, and without limitation, the level of liquid hydrogen in cryogenic fuel tanks for space missions. One example of such an implementation is shown in FIG. 19. As seen in FIG. 19, an optical fiber 80 as described in connection with FIGS. 4A and 4B is used to monitor the level of water 250 contained in tank 255. Optical fiber 80 includes single mode fiber portion 85 (having a core and cladding (not shown)) that is joined to, such as by fusion splicing, multi-mode fiber portion 100 (having a core and cladding (not shown)) at a junction 130. Optical fiber 80 also includes thermal coating 115 and an in-fiber optic component (surrounded by thermal coating 115 and not shown in FIG. 19) in the form of a uniform 5 mm FBG. A sensing light 125 is directed through the core of single mode fiber portion 85 and a power light 135 (comprising ten watts of 910 nm laser light from a high power diode laser array) is directed through the core of multi-mode fiber portion 100. As described in connection with FIGS. 4A and 4B, junction 130 acts as an optical tap region that allows a portion of power light 135 to leak out of the core and into of multi-mode fiber portion 100, where it is ultimately absorbed by thermal coating 115. The absorbed power light 135 heats thermal coating 115 which in turn radiates heat that is conducted therefrom and heats in-fiber optic component 120. FIG. 20 shows the spectral response of the FBG of the optical fiber 80 of FIG. 19: (i) in water with no power light 135, (ii) in water with about 115 mW of power light 135, and (iii) in air with about 115 mW of power light 135.

To determine whether the FBG is submersed inside the water 250 inside tank 255 (level sensing), the 910 nm laser was turned on to inject 115 mW power light into multi-mode fiber portion 100 to heat the FBG. When the grating is submersed under the water 250, the resonance peak (solid trace) of the heated FBG is shifted about 60-pm from the unheated peak (dotted trace). When the FBG is pulled above the level of water 250, the FBG reflection peak rapidly shifted over about 1.4 nm from 1541 nm to 1542.4 nm as shown in the FIG. 20 This dramatic thermal response for the heated FBG thus provides unambiguous detection whether or not the FBG is immersed in the water 250. As will be appreciated, such an optical fiber 80 may be used to determine whether a liquid in a container such as tank 255 has fall below or risen above a particular level by positioning the FBG at the level of interest, heating the FBG with a power light 135, and monitoring the spectral response of the FBG.

Figure 21:
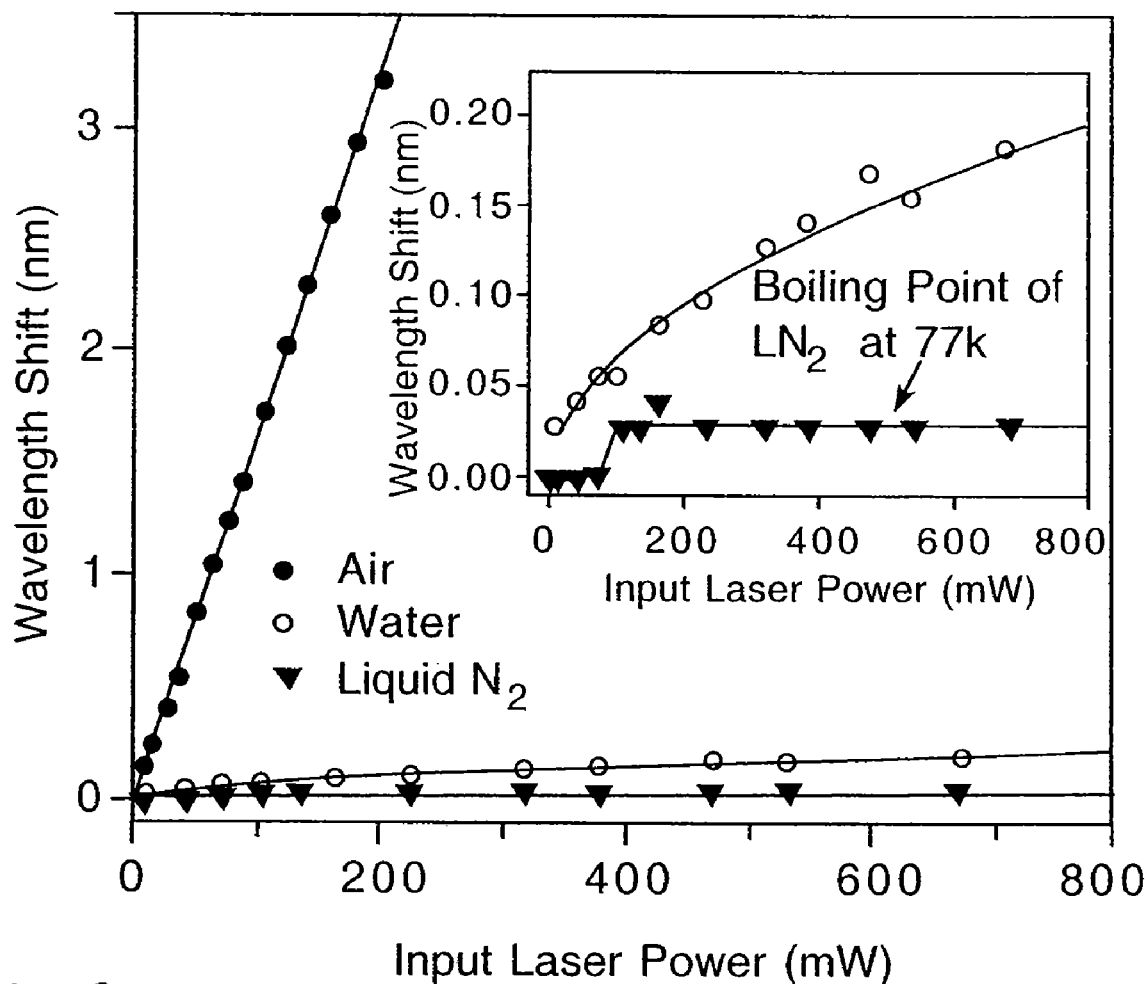
FIG. 21 is a graph that show the thermal responses of a heated grating, such as the FBG of optical fiber system shown in FIG. 19, in air, water, and liquid nitrogen at atmospheric pressure as a function of input laser power (power light) according to an aspect of the present invention.

The thermal responses of a heated grating, such as the FBG of optical fiber 80 shown in FIG. 19, in air, water, and liquid nitrogen as a function of input laser power (power light) are characterized in FIG. 21. As expected, the heated grating when exposed to air produced the largest resonance wavelength shift. The peak shift of the heated grating in ambient room temperature air follows a linear variation with input laser power with a slope of 15 pm per mW. A 10-mW laser input will produce a 150 pm reflection peak shift. This is in contrast to a 20 pm shift in water and a five pm shift in liquid nitrogen. The grating wavelength shifts in water and liquid nitrogen were re-plotted using a reduced vertical scale as shown in the inlet of FIG. 21.

Figure 22:
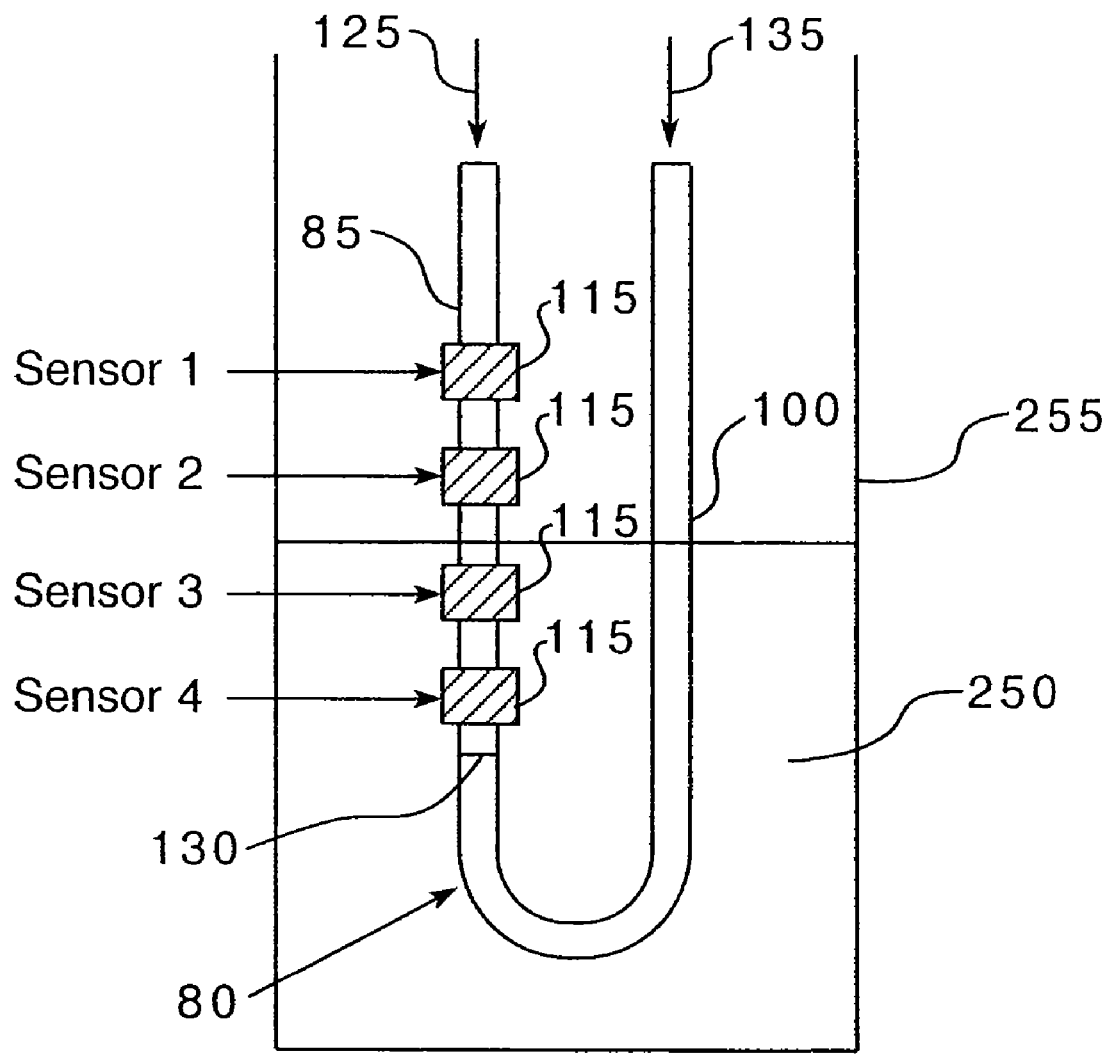
FIG. 22 is a schematic diagram of an alternative tunable (active) optical fiber system including multiple FBG type in-fiber optic components powered by in-fiber light that may be utilized as a liquid level sensor according to a further aspect of the present invention.

FIG. 22 is an alternate embodiment of an optical fiber 80 utilized as a liquid level sensor. The optical fiber of FIG. 22 is similar to the optical fiber 80 of FIG. 19 except that it includes four thermal coatings 115 (each surrounding a 5 mm uniform FBG) spaced 3 cm apart from one another along single mode fiber portion 85. For convenience, the FBGs shall be referred to as sensor 1, sensor 2, sensor 3 and sensor 4, with sensor 4 being located about 3 cm from junction 130. As seen in FIG. 22, sensor 1 has the shortest resonance wavelength and is the topmost FBG, and sensor 4 has the longest resonance wavelength is the lowest FBG. The optical fiber 80 of FIG. 22 can thus be used to sense the presence of liquid at four different locations, and as a result can sense four different liquid levels within a container such as tank 255.

Figure 23A:
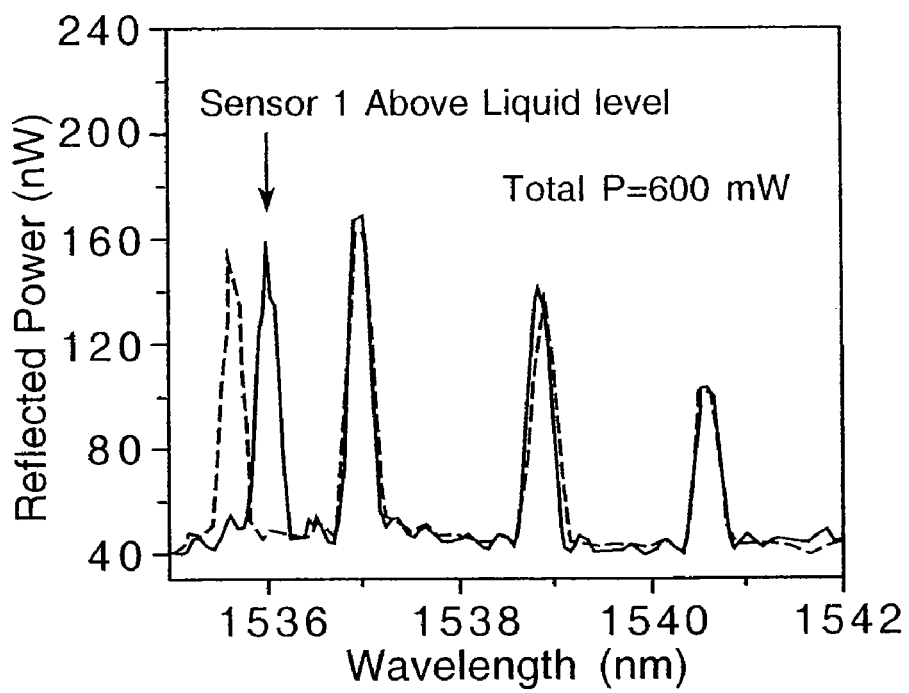
FIGS. 23A through 23D show the reflection spectrum of each of the FBGs of the optical fiber system of FIG. 22 under various conditions.

FIGS. 23A through D show the reflection spectrum of each FBG (sensors 1-4) in an unheated condition (no power light 135) in dotted line form. When the optical fiber 80 is pulled out from the water 250, sensor 1 is the first grating to rise above the water level and sensor 4 is the last to emerge. FIG. 23A shows the reflection spectrum of the heated FBG when sensor 1 is pulled out from the water with 600-mW input laser power (power light 135). The resonance peak for sensor 1 shifted 350 pm from 1535.7 nm to 1536.05 nm. Due to the much larger specific heat and thermal convection rates of water than those of air, reflection peaks for heated gratings remaining in the water shifted less than 10 pm. The dramatic resonance peak shift for sensor 1 above the liquid surface provides unambiguous detection of the liquid level.

Figure 23B:
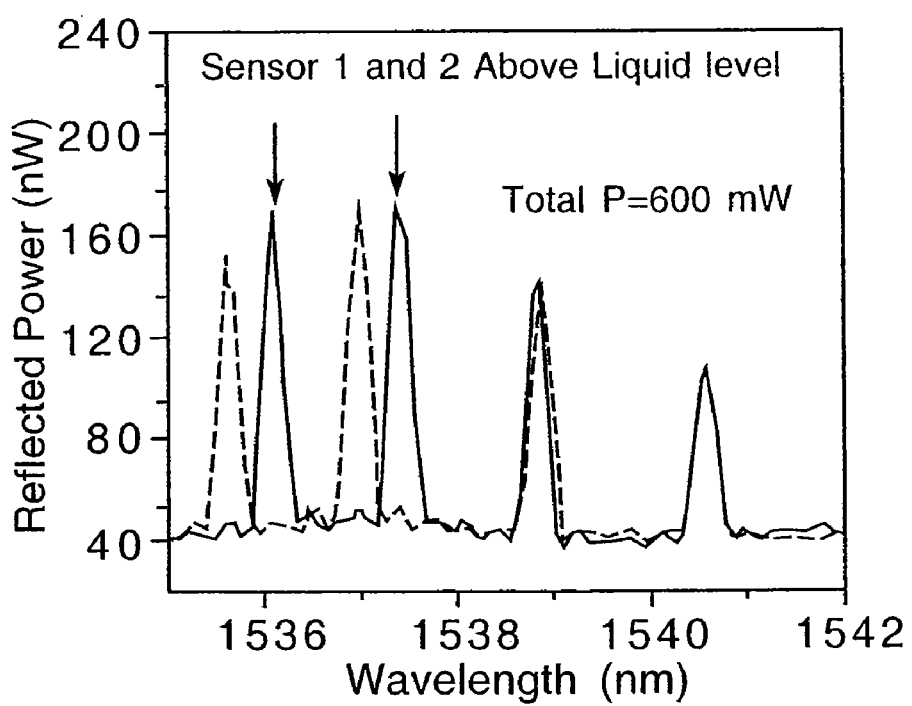
Figure 23C:
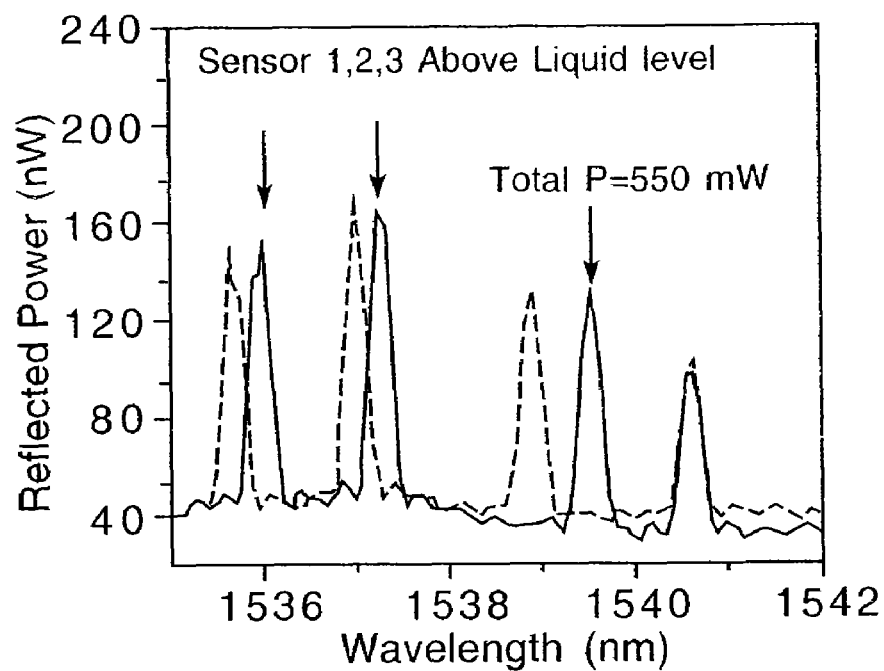
Figure 23D:
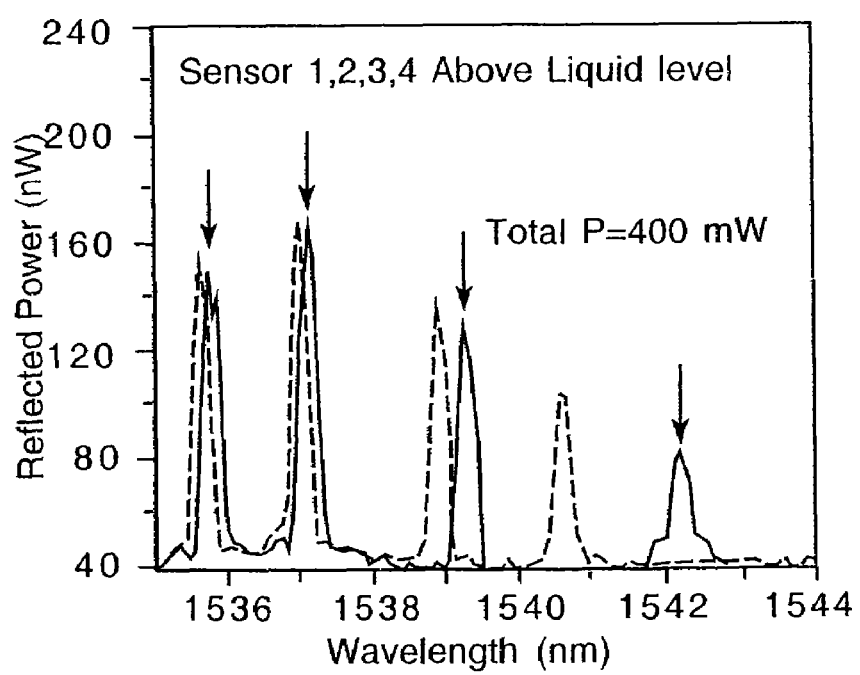

As shown in FIGS. 23B-23D, similar behavior is observed when sensors 2, 3 and 4 are pulled out from the water 250 in Succession. FIGS. 23C and 23D also show non-uniform peak shifts for the different FBGs while the input laser power (power light 135) is reduced to 550 mW and then to 400 mW. This is due to the non-uniform leakage profile in single mode fiber portion 85. The power is reduced to avoid the spectral deformation of sensor 4 due to overheating.

The level sensing applications have been described herein using optical fiber 80 as shown in FIGS. 4A and 4B. It should be understood, however, that this is for illustrative purposes and that other embodiments of the present invention, such as the optical fiber 30 shown in FIGS. 2A and 2B may also be used in level sensing applications.

Finally, the particular embodiments described above in connection with FIGS. 2-12 have been based on the conversion of the in-fiber power light (75, 135, 230) to thermal energy using an optical transducing element comprising a light absorbing thermal coating (60, 115, 210). However, the concept of the present invention is not limited to the conversion of the in-fiber power light to thermal energy. The in-fiber power light may also be converted to other energy types (that are then used to tune an in-fiber optic component), such as mechanical, acoustic, electrical, magnetic and optical (at other wavelengths) energy using various types of alternative transducing elements and energy conversion/harvesting mechanisms. For example, recent developments in the area of photo-mechanics have shown that polymer membranes containing light-sensitive molecules undergo rapid photo-contraction or expansion under weak polarized light radiation. In particular, recent investigations have shown that liquid-crystal membranes containing azobenzene chromeophore can be repeatedly bent without apparent fatigue. Such membranes may be provided on an optical fiber containing an in-fiber optic component, and bending, twisting, stretching and/or compressing of such membranes using in-fiber power light may be utilized to tune the in-fiber optic component (e.g., to change the spacing of the grating of an FBG or to deform a micro-mirror to adjust the Q-value and finesse of a micro-optical resonator). In this case, the membrane acts as an on-fiber actuator. In addition, such a membrane may be attached to a piezo actuator membrane to provide on-fiber optical-to-electrical conversion, without wires attached from the light transmitting end of the fiber. In addition, laser micromachining of a thermal coating such as thermal coatings 60 and 115 will enable in-fiber optical energy to induce periodic index modulation to produce long period fiber grating filters for in-fiber power equalization.

While specific embodiments of the invention have been described in detail, it will be appreciated by those skilled in the art that various modifications and alternatives to those details could be developed in light of the overall teachings of the disclosure. For example, although a number of example embodiments have been shown and described herein in which the in-fiber optic component is an FBG, it will be appreciated that the present invention may be utilized with many different types of known or later developed in-fiber optic components, such as, without limitation, Mach-Zehnder, Sagnac and Michelson interferometers, ring oscillators or Fabry-Perot cavities. Accordingly, the particular arrangements disclosed are meant to be illustrative only and not limiting as to the scope of the invention which is to be given the breadth of the claims appended in any and all equivalents thereof.

What is claimed is:

1. An optical fiber system, comprising:

an optical fiber having a core, an inner cladding surrounding said core and an outer cladding surrounding said inner cladding, wherein said core is made of a first material having a first index of refraction, said inner cladding is made of a second material having a second index of refraction, and said outer cladding is made of a third material having a third index of refraction, said first index of refraction being greater than said second index of refraction, and said second index of refraction being greater than said third index of refraction, said optical fiber propagating a sensing/signal light and a power light separate from said sensing/signal light, said sensing/signal light being propagated in said core and said power light being propagated by at least said inner cladding;

an in-fiber optic component provided at least partially in said core at a first location;

an optical transducing element located in proximity to said first location; and an optical tap region provided within said optical fiber in proximity to said optical transducing element, said optical tap region comprising a portion of said optical fiber wherein said optical fiber has been modified in a manner that causes a local index of refraction of said inner cladding at said portion to be less than a local index of refraction of said outer cladding at said portion, said optical tap region enabling at least a portion of said power light to be released from said optical fiber and be absorbed by said optical transducing element;

wherein said optical transducing element converts the absorbed at least a portion of said power light into a second energy form, and wherein said second energy form is used to tune said in-fiber optic component.

2. The optical fiber system according to claim 1, wherein said optical transducing element comprises a layer of light absorbing material attached to said optical fiber in proximity to said first location.

3. The optical fiber system according to claim 2, wherein said layer of light absorbing material covers an entire circumference of said optical fiber.

4. The optical fiber system according to claim 2, wherein said light absorbing material comprises a metal film.

5. The optical fiber system according to claim 2, wherein said light absorbing material is selected from the group consisting of a metallic film, a light absorbing polymer, carbon, a semiconductor material, a ceramic material, a light absorbing; doped glass, a metal oxide, a metal nitride and a metal carbide.

6. The optical fiber system according to claim 2, wherein said second energy form is heat, said heat being at least one of radiated by and conducted from said light absorbing material and heating at least one of said optical fiber and said in-fiber optic component.

7. The optical fiber system according to claim 1, wherein said power light is also propagated by said core.

8. The optical fiber system according to claim 1, wherein said first material comprises fused silica doped with a first doping material, said second material comprises fused silica, and said third material comprises fused silica doped with a second doping material.

9. The optical fiber system according to claim 8, wherein said first doping material is germanium and said second doping material is fluorine.

10. The optical fiber system according to claim 8, wherein said first doping material is a combination of germanium and boron and said second doping material is fluorine.

11. A method of tuning an in-fiber optic component, comprising:
- providing an optical fiber having a core and one or more cladding layers surrounding said core, said in-fiber optic component being provided at least partially in said core at a first location;
- providing an optical transducing element in proximity to said first location;
- propagating a sensing/signal light in said core in manner that causes said sensing/signal light to be confined within said core;
- propagating a power light in at least one of said one or more cladding layers of said optical fiber, said power light being separate from said sensing/signal light; and
- causing at least a portion of said power light to be released from said optical fiber and be absorbed by said optical transducing element, said optical transducing element converting the absorbed at least a portion of said power light into a second energy form, wherein said second energy form tunes said in-fiber optic component.

12. The method according to claim 11, wherein said optical transducing element comprises a layer of light absorbing material attached to said optical fiber in proximity to said first location.

13. The method according to claim 12, wherein said second energy form is heat, said heat being at least one of radiated by and conducted from said light absorbing material and heating at least one of said optical fiber and said in-fiber optic component.

14. An optical fiber, comprising:
- a core, said core being made of a first material having a first index of refraction;
- an inner cladding surrounding said core, said inner cladding being made of a second material having a second index of refraction; and
- an outer cladding surrounding said inner cladding, said outer cladding being made of a third material having a third index of refraction;
- wherein said first index of refraction is greater than said second index of refraction, wherein said second index of refraction is greater than said third index of refraction, and wherein said optical fiber includes an optical tap region, said optical tap region comprising a portion of said optical fiber wherein said optical fiber has been modified in a manner that causes a local index of refraction of said inner cladding at said portion to be less than a local index of refraction of said outer cladding at said portion, said optical tap region enabling light to be released from said inner cladding into said outer cladding.

15. The optical fiber according to claim 14, wherein said first material comprises fused silica doped with a first doping material, said second material comprises fused silica, and said third material comprises fused silica doped with a second doping material.

16. The optical fiber according to claim 15, wherein said first doping material is germanium and said second doping material is fluorine.

17. The optical fiber according to claim 15, wherein said first doping material is a combination of germanium and boron and said second doping material is fluorine.

18. The optical fiber according to claim 14, wherein said core has an elliptical shape.

19. The optical fiber according to claim 18, wherein said core has a minor axis of about 5 micrometers and a major axis of about 8 micrometers.

20. The optical fiber according to claim 19, wherein said inner cladding has an outer diameter of about 105 micrometers and said outer cladding has an outer diameter of about 125 micrometers.

21. The optical fiber according to claim 18, wherein said core is a polarization maintaining ellipse.

22. The optical fiber according to claim 21, wherein said core is a polarization maintaining ellipse having a beat length of less than about 4 mm at about 1550 nm.

23. The optical fiber according to claim 14, wherein said first index of refraction is equal to about 1.45, said second index of refraction is equal to about 1.445, and said third index of refraction is equal to about 1.44.

24. The optical fiber according to claim 14, wherein said optical fiber has been modified in a manner that causes a local index of refraction of said inner cladding at said portion to be less than a local index of refraction of said outer cladding at said portion by application of one or more of optical radiation, ionizing radiation and ion implantation to said portion.

25. The optical fiber system according to claim 1, wherein said optical fiber has been modified in a manner that causes a local index of refraction of said inner cladding at said portion to be less than a local index of refraction of said outer cladding at said portion by application of one or more of optical radiation, ionizing radiation and ion implantation to said portion.

* * * * *

UNITED STATES PATENT AND TRADEMARK OFFICE
CERTIFICATE OF CORRECTION

PATENT NO. : 7,349,600 B2 Page 1 of 1
APPLICATION NO. : 11/741396
DATED : March 25, 2008
INVENTOR(S) : Peng Chen It is certified that error appears in the above-identified patent and that said Letters Patent is hereby corrected as shown below:

Column 13, line 67 - Delete the word "of" before the word "multi-mode."

Figure 14 (bottom of sheet 8 of 15) - Correct the spelling of the word --wavelength-- on the left-hand side of the graph.

Signed and Sealed this

Ninth Day of December, 2008

JON W. DUDAS
*Director of the United States Patent and Trademark Office*